(12) United States Patent
Sogabe

(10) Patent No.: US 10,388,165 B2
(45) Date of Patent: Aug. 20, 2019

(54) REPORTING SYSTEM, INFORMATION-PROCESSING SYSTEM, SERVER DEVICE, TERMINAL DEVICE, AND NON-TRANSITORY STORAGE MEDIUM

(71) Applicant: DENSO CORPORATION, Kariya, Aichi-pref. (JP)

(72) Inventor: Haruhiko Sogabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 261 days.

(21) Appl. No.: 15/325,535

(22) PCT Filed: Jul. 28, 2015

(86) PCT No.: PCT/JP2015/003787
§ 371 (c)(1),
(2) Date: Jan. 11, 2017

(87) PCT Pub. No.: WO2016/024386
PCT Pub. Date: Feb. 18, 2016

(65) Prior Publication Data
US 2017/0162052 A1    Jun. 8, 2017

(30) Foreign Application Priority Data
Aug. 11, 2014    (JP) ................................ 2014-163892

(51) Int. Cl.
*G08G 1/01* (2006.01)
*G08G 1/16* (2006.01)
(Continued)

(52) U.S. Cl.
CPC ............. *G08G 1/162* (2013.01); *B60R 21/00* (2013.01); *G01C 21/26* (2013.01); *G01S 19/42* (2013.01);
(Continued)

(58) Field of Classification Search
CPC ........ G08G 1/162; G08G 1/164; G01S 19/42; G01C 21/26
See application file for complete search history.

(56) References Cited

U.S. PATENT DOCUMENTS 5,699,056 A * 12/1997 Yoshida ................. G01C 21/26
340/905
5,757,359 A * 5/1998 Morimoto .............. G01C 21/36
345/156

(Continued)

FOREIGN PATENT DOCUMENTS

CN    103730020 A    4/2014
JP    H09139709 A    5/1997
(Continued)

*Primary Examiner* — Ramsey Refai
(74) *Attorney, Agent, or Firm* — Harness, Dickey & Pierce, P.L.C.

(57) ABSTRACT

An information processing system acquires traveling area information, and transmits an entry signal to a server device when determined that a vehicle has entered a specific range. The entry signal includes traveling area information and specifying information for specifying the information processing system. When detecting a stop of traveling of the vehicle, the system transmits a first stop signal including the traveling area information to the server device. The server device stores the traveling area information and the specifying information, included in the entry signal, in association with each other when receiving the entry signal. The server device generates a second stop signal based on the first stop signal. The server device specifies the information processing system based on the travelling area information in the first stop signal, the stored traveling area information and the stored specifying information, and transmits the second stop signal to the specified information processing system.

5 Claims, 20 Drawing Sheets

(51) Int. Cl.
*B60R 21/00* (2006.01)
*G01C 21/26* (2006.01)
*G01S 19/42* (2010.01)
*G08G 1/09* (2006.01)
*G08G 1/0967* (2006.01)
*G07B 15/06* (2011.01)

(52) U.S. Cl.
CPC ............ *G07B 15/063* (2013.01); *G08G 1/091* (2013.01); *G08G 1/09675* (2013.01); *G08G 1/096716* (2013.01); *G08G 1/096741* (2013.01); *G08G 1/096775* (2013.01); *G08G 1/164* (2013.01); *G08G 1/0112* (2013.01)

(56) References Cited

U.S. PATENT DOCUMENTS

| | | | | |
|---|---|---|---|---|
| 5,900,825 A | * | 5/1999 | Pressel | G01C 21/3629 340/905 |
| 6,236,933 B1 | * | 5/2001 | Lang | G08G 1/0104 340/905 |
| 6,731,940 B1 | * | 5/2004 | Nagendran | H04L 29/06 455/456.1 |
| 8,766,817 B2 | * | 7/2014 | Sri-Jayantha | G08G 1/0112 340/539.18 |
| 8,935,036 B1 | * | 1/2015 | Christensen | G06Q 40/08 701/29.1 |
| 9,047,778 B1 | * | 6/2015 | Cazanas | G08G 1/166 |
| 9,679,487 B1 | * | 6/2017 | Hayward | G08G 1/166 |
| 9,734,712 B1 | * | 8/2017 | Lai | G08G 1/127 |
| 2004/0073356 A1 | * | 4/2004 | Craine | G08G 1/096716 701/117 |
| 2004/0107042 A1 | * | 6/2004 | Seick | G08G 1/0104 701/117 |
| 2005/0027451 A1 | * | 2/2005 | Funayose | G01C 21/20 701/469 |
| 2006/0282214 A1 | * | 12/2006 | Wolterman | G01C 21/26 701/450 |
| 2007/0054685 A1 | * | 3/2007 | Kellum | G01S 13/931 455/517 |
| 2009/0300035 A1 | * | 12/2009 | Denaro | G01C 21/32 |
| 2013/0096829 A1 | | 4/2013 | Kato et al. | |
| 2013/0141251 A1 | * | 6/2013 | Sims | B60Q 9/008 340/905 |
| 2015/0170522 A1 | * | 6/2015 | Noh | G08G 1/096741 701/117 |
| 2015/0179062 A1 | * | 6/2015 | Ralston | G01C 21/26 701/117 |

FOREIGN PATENT DOCUMENTS

| | | |
|---|---|---|
| JP | 2002222491 A | 8/2002 |
| JP | 2011025862 A | 2/2011 |
| JP | 2012023505 A | 2/2012 |
| JP | 2013101589 A | 5/2013 |
| JP | 2013142978 A | 7/2013 |
| JP | 2014115129 A | 6/2014 |
| WO | WO-2016024384 A1 | 2/2016 |
| WO | WO-2016024385 A1 | 2/2016 |

* cited by examiner

REPORTING SYSTEM, INFORMATION-PROCESSING SYSTEM, SERVER DEVICE, TERMINAL DEVICE, AND NON-TRANSITORY STORAGE MEDIUM

CROSS REFERENCE TO RELATED APPLICATIONAPPLICATIONS

This application is a U.S. National Phase Application under 35 U.S.C. 371 of International Application No. PCT/JP2015/003787 filed on Jul. 28, 2015 and published in Japanese as WO 2016/024386 A1 on Feb. 18, 2016. This application is based on and claims the benefit of priority from Japanese Patent Application No. 2014-163892 filed on Aug. 11, 2014. The entire disclosures of all of the above applications are incorporated herein by reference.

TECHNICAL FIELD

The present disclosure relates to a reporting system which includes an information processing system present inside a vehicle, and a server device that wirelessly communicates with the information processing system.

BACKGROUND ART

When a vehicle traveling on a road, particularly on a highway, stops traveling, this vehicle is supposed to promptly give a signal to a following vehicle to notify the following vehicle about the vehicle stop. Use of a reflector or a smoke pot for giving this notification requires a time for preparation, and therefore may be difficult to prevent occurrence of an accident in some cases.

According to a conventional technology currently proposed, a base station side arithmetic device receives a plurality of sets of vehicle information, determines distinction between preceding vehicles and following vehicles, and supplies information to vehicles determined as following vehicles (see Patent Literature 1). According to the technology of Patent Literature 1, a positional relationship between a plurality of vehicles is determined in accordance with positions of the vehicles specified based on acquired GPS position signals.

PRIOR ART LITERATURES

Patent Literature

Patent Literature 1: JP-2002-222491-A

SUMMARY OF INVENTION

At the time of a stop of a traveling vehicle, an accident is avoidable with a higher probability as a driver of a following vehicle recognizes the stop of the preceding vehicle in an earlier stage. It is therefore preferable that information indicating the stop of the vehicle is transmitted to the following vehicle at earliest possible timing.

It is an object of the present disclosure to provide a technology for promptly transmitting information to other vehicles at the time of a stop of a traveling vehicle.

According to a first aspect of the present disclosure, a reporting system includes: an information processing system arranged on a vehicle; and a server device that wirelessly communicates with the information processing system.

The information processing system includes: an information acquisition unit; an entry determination unit; an entry signal transmission unit; a stop detection unit; a first transmission unit; and a processing execution unit.

The information acquisition unit acquires traveling area information corresponding to information on an area where the vehicle travels. The entry determination unit determines whether the vehicle has entered a specific range. The entry signal transmission unit transmits, to the server device, an entry signal as a signal including the traveling area information acquired by the information acquisition unit and specifying information for specifying the information processing system when the entry determination unit determines that the vehicle has entered the specific range.

The stop detection unit detects a signal associated with a stop of traveling of the vehicle. The first transmission unit transmits a first stop signal, as a signal including the traveling area information, to the server device when the stop detection unit detects the signal associated with the stop.

The processing execution unit executes a predetermined process when receiving a second stop signal as a signal including information on a stop position of a different vehicle different from the vehicle on which the information processing system is arranged, the second stop signal being transmitted from the server device when the server device receives the first stop signal transmitted from the information processing system arranged on the different vehicle.

The server device includes: a vehicle information storage unit; a signal generation unit; a transmission destination specifying unit; and a second transmission unit.

The vehicle information storage unit stores the traveling area information and the specifying information in association with each other when receiving the entry signal, which includes the traveling area information and the specifying information and is transmitted from the entry signal transmission unit. The signal generation unit generates the second stop signal based on the first stop signal transmitted from the first transmission unit.

The transmission destination specifying unit specifies the information processing system when receiving the first stop signal transmitted from the first transmission unit, based on the traveling area information and the specifying information stored in the vehicle information storage unit, the information processing system being disposed in a range defined based on the traveling area information included in the first stop signal. The second transmission unit transmits the second stop signal, generated by the signal generation unit, to the information processing system specified by the transmission destination specifying unit.

According to the reporting system having this configuration, the server device specifies the information processing system corresponding to a transmission destination based on the traveling area information stored in the vehicle information storage unit. In this case, the transmission destination is specified only based on comparison between the first stop signal and the traveling area information stored beforehand at the time of reception of the first stop signal. Accordingly, prompt transmission of the second stop signal is achievable.

According to a second aspect of the present disclosure, a reporting system includes: an information processing system arranged on a vehicle; and a server device that wirelessly communicates with the information processing system.

The information processing system includes: an information acquisition unit; a stop detection unit; a first transmission unit; and a processing execution unit. These are similar to the above-described first aspect.

The server device includes: a signal generation unit; a transmission range setting unit; and a second transmission unit. The signal generation unit is similar to the above-described first aspect.

The transmission range setting unit sets a road range, to which the second stop signal is transmitted, based on at least the traveling area information included in the first stop signal when receiving the first stop signal from the first transmission unit. The second transmission unit broadcasts the second stop signal generated by the signal generation unit to the road range set by the transmission range setting unit.

According to the reporting system having this configuration, the server device sets a range to which the second stop signal is transmitted, based on the signal transmitted from the information processing system, and transmits the second stop signal to this range. This configuration eliminates the necessity for individually determining the position of the information processing system. Accordingly, prompt transmission of the second stop signal is achievable while reducing a processing load on the server device.

According to a third aspect of the present disclosure, a reporting system includes: an information processing system arranged on a vehicle; and a server device that wirelessly communicates with the information processing system.

The information processing system includes: a vehicle information acquisition unit; an entry determination unit; an entry transmission unit; an area information storage unit; a stop detection unit; a first transmission unit; and a processing execution unit. The entry determination unit; the stop detection unit; and the processing execution unit are similar to the above-described first aspect are similar to the above-described first aspect.

The vehicle information acquisition unit acquires position information on the vehicle and information indicating a state of the vehicle including information on steering rotation. The entry transmission unit transmits an entry signal to the server device when the entry determination unit determines that the vehicle has entered the specific range, the entry signal including the information indicating the state of the vehicle acquired by the vehicle information acquisition unit and specifying information for specifying the information processing system.

The area information storage unit stores traveling area information transmitted from the server device as information on an area where the vehicle travels. The first transmission unit transmits, to the server device, a first stop signal as a signal including the traveling area information stored in the area information storage unit when the stop detection unit detects the signal associated with the stop.

The server device includes: an area information generation unit; an area information transmission unit; a signal generation unit; a signal transmission destination setting unit; and a second transmission unit. The signal generation unit is similar to the above-described first aspect.

The area information generation unit generates the traveling area information based on the information on the state of the vehicle included in the entry signal transmitted from the entry transmission unit. The area information transmission unit transmits the traveling area information, generated by the area information generation unit, to the information processing system which is a transmission source of the information indicating the state of the vehicle, the information processing system specified by the specifying information included in the entry signal.

The signal transmission destination setting unit sets a transmission destination, to which the second stop signal is transmitted, based on at least the traveling area information included in the first stop signal when receiving the first stop signal transmitted from the first transmission unit. The second transmission unit transmits the second stop signal, generated by the signal generation unit, to the transmission destination set by the signal transmission destination setting unit.

According to the reporting system having this configuration, the server device generates the traveling area information based on the signal transmitted from the information processing system. Accordingly, a processing load imposed on the information processing system decreases.

According to another aspect of the present disclosure, there is provided an information processing system constituting the reporting system according to any one of the first to third aspects described above. According to a further aspect, there is provided a server device constituting the reporting system according to any one of the first to third aspects described above. The information processing system and the server device having this configuration constitute a part of the reporting system described above.

According to a still further aspect of the present disclosure, there is provided a terminal device including the information acquisition unit, the entry determination unit, the entry signal transmission unit, the stop detection unit, the first transmission unit, and the processing execution unit constituting the information processing system constituting the reporting system according to any one of the first to third aspects described above. The terminal device is allowed to be taken out from the vehicle.

The terminal device having this configuration constitutes a part of the information processing system described above.

The respective function units constituting the information processing system described above may be implemented in the form of hardware, or in the form of a program causing a computer performs to function the information acquisition unit, the entry determination unit, the entry signal transmission unit, the stop detection unit, the first transmission unit, and the processing execution unit in the information processing system. The program may be stored in a non-transitory recording medium and provided as the recording medium, or may be provided via an electric communication line.

The program having this configuration causes a computer to function as a part of the information processing system described above. Note that the computer may be a computer which includes a storage device capable of storing data, and a communication device capable of wirelessly communicating with the outside.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Embodiments are hereinafter described with reference to the drawings.

[1. First Embodiment]

[1-1. Structure]

Figure 1:
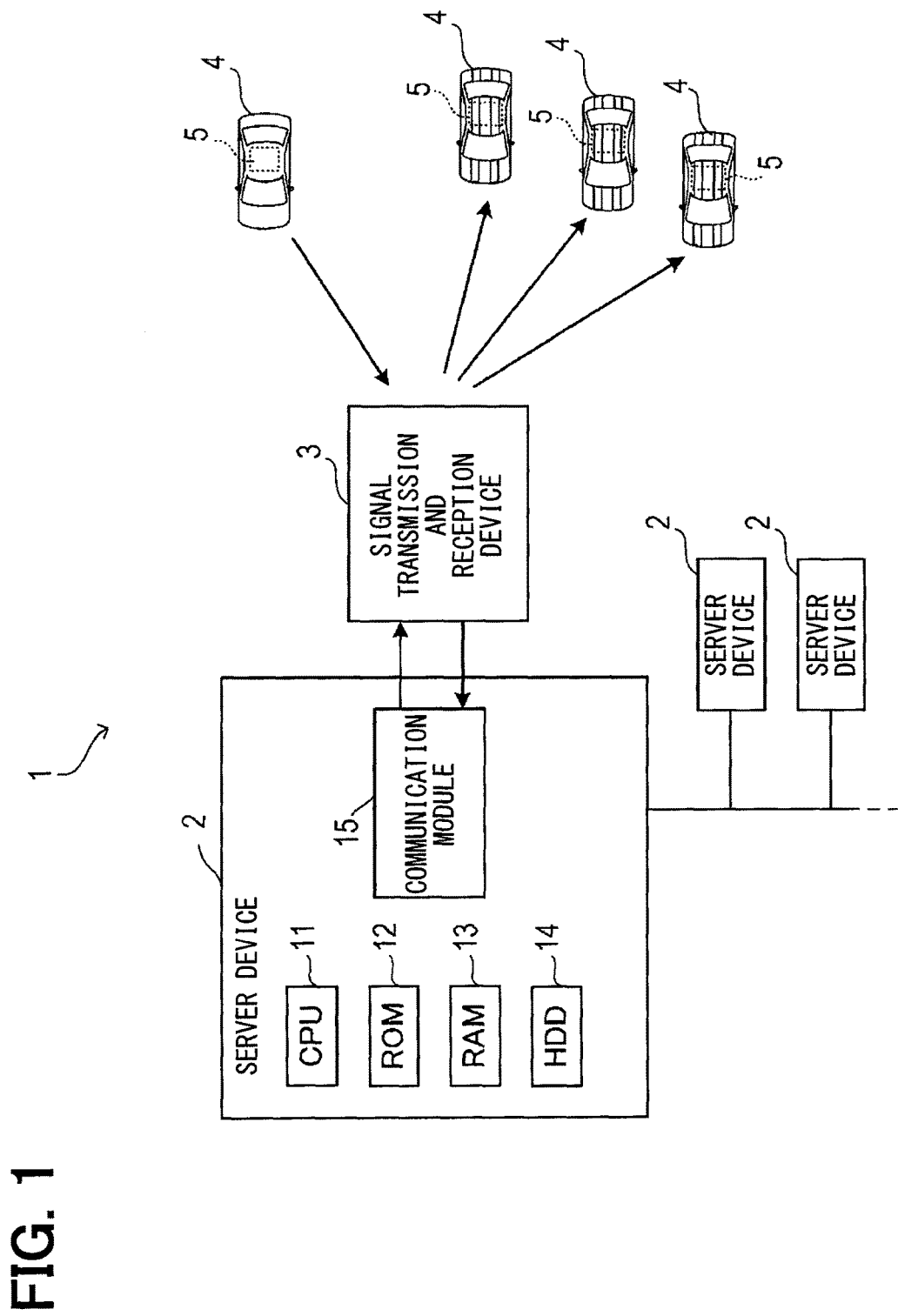
FIG. 1 is a block diagram illustrating a structure of a reporting system.

A reporting system 1 illustrated in FIG. 1 is a system including a server device 2, a signal transmission and reception device 3, and a plurality of information processing systems 5 each of which is mounted on a corresponding vehicle 4. The server device 2 and the information processing systems 5 wirelessly communicate with each other via the signal transmission and reception device 3.

The server device 2 is a known computer system constituted by a CPU 11, a ROM 12 that stores programs and the like executed by the CPU 11, a RAM 13 that provides a working area when the programs are executed by the CPU 11, a hard disk drive (HDD) 14 that includes storage areas for storing various data, a communication module 15 that wirelessly communicates with the signal transmission and reception device 3, and a-not shown bus line that connects these components.

The server device 2 is connected to the other server devices 2 to perform wireless or wired communication with the other server devices 2. Each of the server devices 2 transmits and receives data to and from the corresponding signal transmission and reception device 3.

One-to-one correspondence between the server device 2 and the signal transmission and reception device 3 is not required. The single server device 2 may control a plurality of the signal transmission and reception devices 3, or a plurality of the server devices 2 may control the single signal transmission and reception device 3. Only the single server device 2, rather than a plurality of server devices 2, may be provided.

The signal transmission and reception device 3 is a device that wirelessly communicates with each of the information processing systems 5. According to the present embodiment, the signal transmission and reception device 3 is constituted by communication equipment provided at a base station for mobile communication (communication equipment of lines such as LTE (Long Term Evolution) and 3G (3rd generation) communication). Alternatively, the signal transmission and reception device 3 may be constituted by any one of various types of devices other than a base station, such as a communication device provided on a road for providing road-to-vehicle communication.

The signal transmission and reception device 3 and the information processing system 5 may be configured to communicate with each other by using communication systems in conformity to a plurality of communication standards. In this case, communication systems may be made switchable according to contents to be transmitted and received. For example, for realizing transmission and reception by different communication systems for each, FM multiplexing broadcast equipment may be used for transmission of signals from the signal transmission and reception device 3 to the information processing systems 5, while telephone lines may be used for reception of signals.

Figure 2:
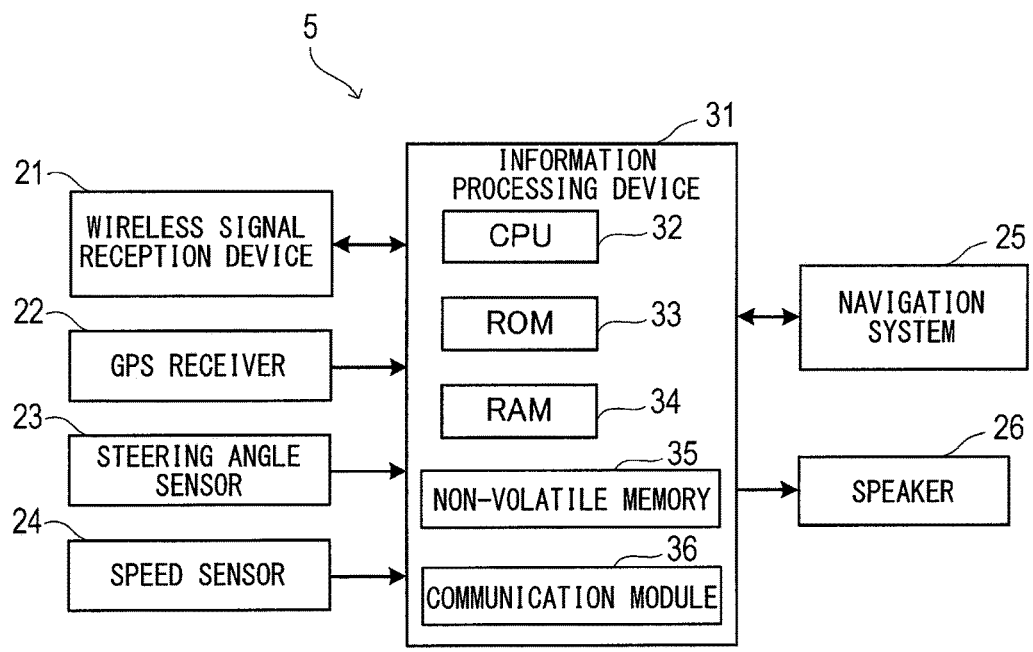
FIG. 2 is a block diagram illustrating a structure of an information processing system.

Each of the information processing systems 5 is a device that wirelessly communicates with the server device 2 via the signal transmission and reception device 3. As illustrated in FIG. 2, the information processing system 5 includes a wireless signal reception device 21, a GPS receiver 22, a steering angle sensor 23, a speed sensor 24, a navigation system 25, a speaker 26, an information processing device 31, and others.

The wireless signal reception device 21 is a device that receives a signal including information for specifying a position or the like of a predetermined area when the vehicle 4 is located in this area. According to the present embodiment, the wireless signal reception device 21 is constituted by an in-vehicle ETC (Electronic Toll Collection System) device. The wireless signal reception device 21 outputs ETC information received via a road-side antenna to the information processing device 31. As for an automatic toll collection function of the wireless signal reception device 21, there is substantially no connection between this function and the embodiment described herein. Accordingly, explanation of this function is not given.

The GPS (Global Positioning System) receiver 22 receives a signal from a GPS artificial satellite via a not-shown antenna, and outputs the signal to the information processing device 31.

The steering angle sensor 23 is a sensor that detects an angle of a steering, while the speed sensor 24 is a sensor that detects a traveling speed of the vehicle 4. Detection signals obtained from these sensors are output to the information processing device 31.

The navigation system 25 is a device that includes a position detector constituted by a GPS receiver, a gyro scope, a vehicle speed sensor, or the like, a storage for storing map data, a display for displaying various images such as a map display image, an input device through which various instructions are input from a passenger, and others. The navigation system 25 is capable of executing processes such as a map display process and a route guide process.

The map display process is a process that calculates a current position of a vehicle, based on respective detection signals obtained from the position detector, and that displays a map or the like around the current position on the display, based on the map data stored in the storage. The route guide process is a process that calculates an optimum destination route from the current position to a destination set by the passenger based on the map data stored in the storage, and that provides a traveling guide to the destination while considering the relationship between the current position and the destination route.

The GPS receiver 22 and the speed sensor 24 described above may be used as the GPS receiver and the vehicle speed sensor constituting the navigation system 25.

The speaker 26 receives a control signal from the information processing device 31, and outputs voices to the interior of the vehicle 4.

The information processing device 31 is mainly constituted by a known microcomputer that includes a CPU 32, a ROM 33, a RAM 34, a non-volatile memory 35, a communication module 36, a not-shown input/output, a bus line connecting these components, and others. The CPU 32 performs integrated control over the information processing device 31 under programs or the like stored in the ROM 33 or the non-volatile memory 35.

The communication module 36 is a module for wireless communication with the signal transmission and reception device 3. In a case of communication with the signal transmission and reception device 3 by a plurality of communication systems, a plurality of modules corresponding to these communication systems are provided. According to the present embodiment, the communication module 36 provides communication via a mobile communication network, and is given a telephone number for identifying the communication module 36.

Figure 3:
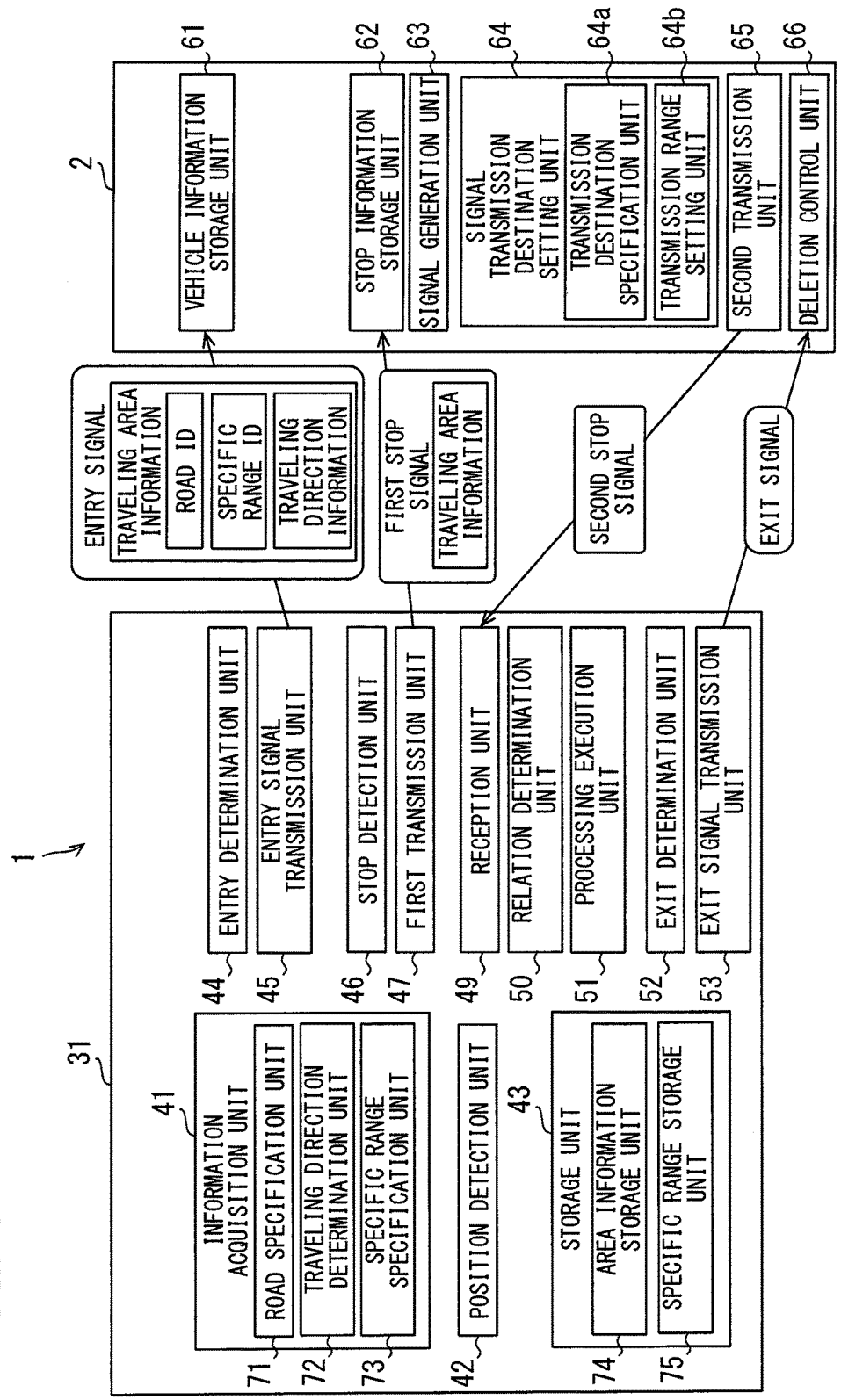
FIG. 3 is a function block diagram of the reporting system.

The server device 2 and the information processing device 31 thus configured function as units illustrated in a function block diagram in FIG. 3.

The information processing device 31 functions as an information acquisition unit 41, a position detection unit 42, a storage unit 43, an entry determination unit 44, an entry signal transmission unit 45, a stop detection unit 46, a first transmission unit 47, a reception unit 49, a relation determination unit 50, a processing execution unit 51, an exit determination unit 52, and an exit signal transmission unit 53. The storage unit 43 includes an area information storage unit 74 and a specific range storage unit 75.

The server device 2 functions as a vehicle information storage unit 61, a stop information storage unit 62, a signal generation unit 63, a signal transmission destination setting unit 64, a second transmission unit 65, and a deletion control unit 66. The functions of the respective units of the information processing device 31 and the server device 2 will be described below.

[1-2. Function of Reporting System]

The outline of functions of the reporting system 1 is hereinafter described with reference to FIGS. 3 and 4. This outline also touches upon contents different from specific configurations of the present embodiment. However, all of these contents are regarded as matters included in the technical scope of the present disclosure.

Figure 4:
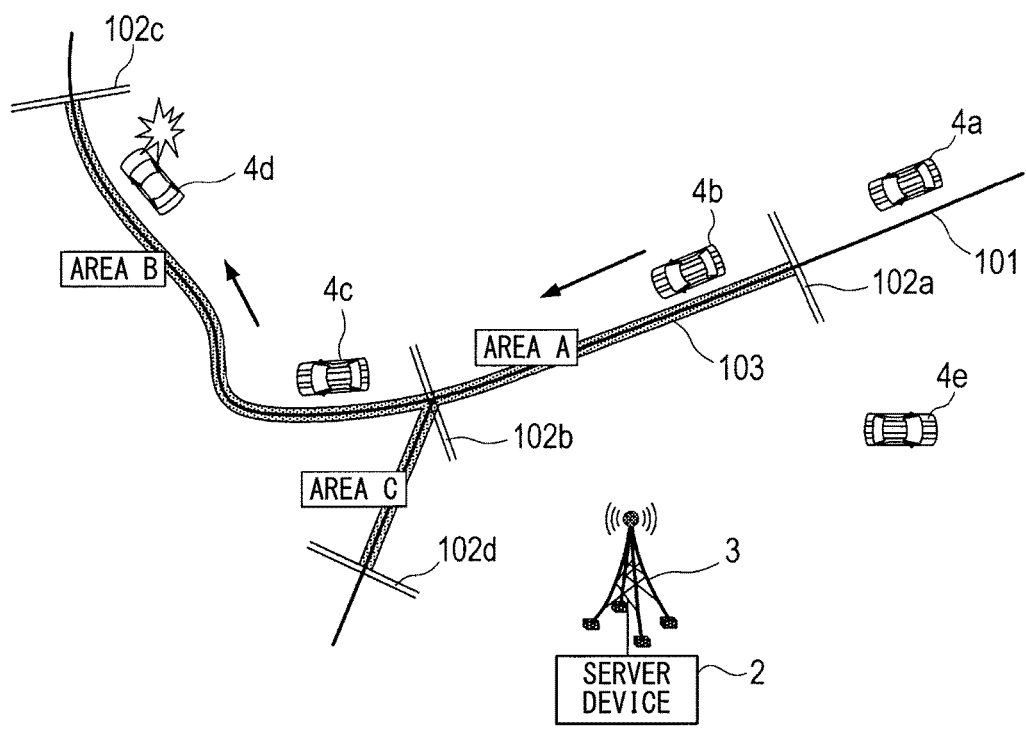
FIG. 4 is a view illustrating functions of the reporting system.

In FIG. 4, the vehicles 4 (4a to 4d) travel on a road 101 in directions indicated by arrows. A vehicle 4e is a vehicle traveling on a road different from the road 101. Boundary areas 102 (102a to 102d) are set on the road 101. A range surrounded by the boundary areas 102a, 102c, and 102d is defined as a specific range 103.

Each of the vehicles 4a to 4e and each of the boundary areas 102a to 102d represent a vehicle and a boundary area located at a different position, respectively. However, these vehicles and boundary areas are collectively referred to as the vehicles 4 and the boundary areas 102, respectively when distinction between the positions of the vehicles and the boundary areas is not needed in the following description.

Each of the vehicles 4 carries the information processing system 5 for executing the following processes. A vehicle carrying the information processing system 5 corresponding to a processing main body is referred to as a self-vehicle, while a vehicle carrying the information processing system 5 different from the processing main body is referred to as a different vehicle in some cases.

(1) Prompt Notification Preparation Stage

Processes performed by the information processing system 5 carried on each of the vehicle 4 are initially described.

The information acquisition unit 41 acquires traveling area information that is information indicating an area where the vehicle is traveling. For example, the traveling area information is information for specifying a road, information for specifying a predetermined range on a road, or information for specifying a traveling direction. An area of a traveling road is changeable for each traveling direction, and therefore an area is identifiable by specifying a traveling direction. The information acquisition unit 41 includes a road specification unit 71, a traveling direction determination unit 72, and a specific range specification unit 73.

The road specification unit 71 specifies the road 101 on which the vehicle 4 is traveling. Arbitrary methods may be used for specifying the road, such as a method for specifying the road based on comparison between the self-vehicle position and map information (map matching).

The self-vehicle position described above is detectable based on GPS information acquired by the position detection unit 42 from the GPS receiver 22. Alternatively, self-vehicle position information may be acquired from the navigation system 25 functioning as a position detection unit.

Other possible methods for specifying the road include a method for specifying the road based on a wireless signal transmitted from a not-shown signal transmission device disposed along the road. This signal is received by the wireless signal reception device 21.

The signal transmission device disposed along the road corresponds to a road-side device of ETC in the present embodiment. However, the signal transmission device may be DSRC (Dedicated Short Range Communications), a beacon, or other signal transmission devices. The road is specified by analyzing a signal transmitted from these signal transmission devices and containing information different for each setting position.

Information on the road specified by the road specification unit 71 is stored in the area information storage unit 74 as a road ID.

The traveling direction determination unit 72 determines an inbound direction or an outbound direction of the traveling road. Arbitrary methods for determining the traveling direction may be used, such as determination based on a change of the self-position with an elapse of time, and determination based on information received from ETC, DSRC, beacons, or other signal transmission devices described above. Information for specifying the traveling direction (hereinafter also abbreviated as traveling direction information) is stored in the area information storage unit 74.

The specific range specification unit 73 specifies the specific range 103 when the vehicle 4 enters this specific range. The specific range 103 is a pre-set range on a road. The reporting system 1 executes respective processes in response to traveling of the vehicle 4 in this range. The specific range storage unit 75 stores information on a plurality of specific ranges, and specifies a specific range into which the vehicle 4 enters from the plurality of specific ranges.

The specific range 103 may be divided into a plurality of small areas as illustrated in FIG. 4. In this case, a small range into which the vehicle enters is specified. In FIG. 4, there are provided an area A ranging from the boundary area 102*a* to the boundary area 102*b*, an area B ranging from the boundary area 102*b* to the boundary area 102*c*, and an area C ranging from the boundary area 102*b* to the boundary area 102*d*. In other words, the areas A to C are specified as different specific ranges.

Arbitrary methods for specifying the specific range may be used, such as (i) specification based on comparison between the self-vehicle position and map information on the specific range (such as information on latitude/longitude of each boundary area 102), and (ii) specification based on information received from ETC, DSRC, beacons, or other signal transmission devices provided in the boundary areas 102.

Information on the plurality of specific ranges is stored in a database of the specific range storage unit 75 as described above. Information used for specification by the method (i) is map information indicating respective extents of the specific ranges. The map information for the respective specific ranges is stored with specific range IDs associated with the corresponding specific ranges.

Information used for specification by the method (ii) is information indicating correlations between the specific ranges and information included in signals received from the signal transmission devices for specifying the setting positions of the signal transmission devices (information indicating ICs (interchange) through which the vehicle has passed in a case of ETC). The specific ranges are stored along with corresponding specific range IDs similarly to the method (i).

The information stored in the database of the specific range storage unit 75 may be updated as necessary. For example, new data may be downloaded, or acquired from a recording medium connected to the specific range storage unit 75.

The specific range IDs specified by the specific range specification unit 73 are stored in the area information storage unit 74.

As described above, the information acquisition unit 41 acquires traveling area information. The traveling area information thus acquired is stored in the area information storage unit 74.

The entry determination unit 44 determines whether the vehicle 4 has entered the specific range 103. Arbitrary methods for determining entry into the specific range 103 may be used, such as determination based on comparison between the self-vehicle position and map information stored beforehand for indicating the specific ranges, and determination based on information received from ETC, DSRC, beacons or other signal transmission devices provided in the boundary areas 102.

The entry signal transmission unit 45 transmits, to the server device 2, an entry signal including the traveling area information, and specifying information for specifying the information processing system 5, when the entry determination unit 44 determines that the vehicle 4 has entered the specific range 103. The specifying information may be a telephone number given to the communication module 36 of the information processing device 31, for example, or an identifier other than a telephone number, such as an account ID.

The server device 2 stores traveling area information and specifying information included in an entry signal in association with each other when the vehicle information storage unit 61 receives the entry signal transmitted from the entry signal transmission unit 45.

A road ID, traveling direction information, and a specific range ID may be combined into one or two sets of information. When respective distinctions of a road, a traveling direction, and ranges of a road are combined into a specific range ID, for example, only the specific range ID is required as traveling area information. Other information may be included in the combined information.

The information acquisition unit 41 may be configured to acquire the traveling area information before the entry determination unit 44 determines entry of the vehicle 4 into the specific range, or when the entry determination unit 44 determines the entry of the vehicle 4 into the specific range.

(2) Prompt Stop Notification Stage

A function of the reporting system 1 performed when the vehicle 4 stops traveling is hereinafter described.

Processes performed by the information processing system 5 carried on each of the vehicle 4 are initially described.

The stop detection unit 46 detects a stop of the vehicle 4, or a state where the vehicle 4 is difficult to continue normal traveling, based on output from sensors carried on the vehicle 4. These states are detectable by detection of signals associated with the traveling stop of the vehicle.

More specifically, a stop of the vehicle 4 is detected based on a signal indicating a predetermined threshold or lower traveling speed of the vehicle 4 (such as 5 km/h or lower), for example. Alternatively, the state where the vehicle 4 is difficult to continue normal traveling is detectable based on a signal indicating an abnormal state of the vehicle 4 or a driver, such as deployment of an airbag, a blowout of a tire, a press of an emergency button, for example.

In the following description, detection of the foregoing signal by the stop detection unit 46 is referred to as detection of a traveling stop of a vehicle. A traveling stop of a vehicle is also abbreviated as a vehicle stop.

The first transmission unit 47 transmits, to the server device 2, a first stop signal including traveling area information stored in the area information storage unit 74, position information on the vehicle 4 detected by the position detection unit 42, and specifying information when the stop detection unit 46 detects a stop of traveling of the vehicle 4. Accordingly, the first stop signal is transmitted in response to a traveling stop of the vehicle 4.

A process performed by the server device 2 is hereinafter described.

The stop information storage unit 62 stores travelling area information, position information, and specifying information included in the first stop signal in association with each other when receiving a first stop signal transmitted from the first transmission unit 47.

The signal generation unit 63 generates a second stop signal based on the received first stop signal. The second stop signal is a signal including information on a stop position of the stopping vehicle 4*d*. More specifically, the second stop signal may include a part or all of traveling area information, or include the first stop signal (latitude/longitude information). Alternatively, the second stop signal may include both traveling area information and the first stop signal.

The signal generation unit 63 may set one or more ranges in accordance with the distance from a starting point corresponding to the current position of the stopping vehicle 4 based on information indicating the current position of the vehicle 4 included in the first stop signal (traveling area information or first stop signal), and generate a second stop signal including range information indicating the range as information on the stop position of the vehicle 4.

The signal transmission destination setting unit 64 sets a transmission destination to which the second stop signal is transmitted. The signal transmission destination setting unit 64 includes a transmission destination specification unit 64a that specifies the information processing system 5 as a transmission destination, and a transmission range setting unit 64b that sets a fixed range as a transmission destination.

In a specific example, the transmission destination specification unit 64a specifies the information processing system 5 carried on the vehicle 4 located behind the stopping vehicle 4 in the traveling direction with respect to a starting point corresponding to the position of the stopping vehicle 4 included in the first stop signal, based on traveling area information stored in the vehicle information storage unit 61.

In a specific example, the transmission range setting unit 64b defines a fixed range based on the position of the stopping vehicle 4 included in the first stop signal, and broadcasts the defined fixed range.

Needless to say, arbitrary methods for setting a transmission destination may be used other than these examples. The information processing system 5 carried on the vehicle 4 located in the vicinity of the stopping vehicle 4, or the information processing system 5 carried on the vehicle 4 located within the same specific range as the range of the stopping vehicle 4 or a specific range in the vicinity of the same specific range, may be specified as a transmission destination, for example.

The second transmission unit 65 transmits the second stop signal to the transmission destination determined by the signal transmission destination setting unit 64. For broadcasting the second stop signal, information is transmitted from the signal transmission and reception device 3 to all the information processing systems 5 located within a range communicative with the signal transmission and reception device 3 (in a manner similar to so-called earthquake prompt announcement via telephone lines), for example. Alternatively, transmission by FM multiplexing broadcast may be adopted, for example.

(3) Warning Stage

The following processes are executed when the different vehicle 4 other than the self-vehicle 4 stops traveling.

The reception unit 49 receives second stop information transmitted from the server device 2.

The relation determination unit 50 determines a positional relationship between the stopping different vehicle 4 and the self-vehicle 4, based on information on a stop position included in the second stop signal received from the reception unit 49, and traveling area information on the self-vehicle 4 stored in the area information storage unit 74. In other words, the relation determination unit 50 determines whether the self-vehicle 4 is located at a distance of notice from the stopping different vehicle (hereinafter also referred to as located in notice area).

More specifically, when the vehicle 4d in FIG. 4 stops, the relation determination unit 50 of the vehicle 4c located within the area B, traveling in the same traveling direction, and positioned behind the vehicle 4d determines that the self-vehicle 4 is located in the notice area. The relation determination unit 50 of the vehicle 4 located at a place other than the foregoing place determines that the self-vehicle 4 is not located within the notice area. This determination method is presented only by way of example. The relation determination unit 50 of the vehicle 4b may determine that the self-vehicle 4b is located within the notice area, for example.

The processing execution unit 51 executes a process determined beforehand in accordance with a result of determination by the relation determination unit 50. For example, the processing execution unit 51 gives a warning to the driver when it is determined that the self-vehicle 4 is located within the notice area. More specifically, the processing execution unit 51 may display a warning screen on the display of the navigation system 25, or emit warning sound from the speaker 26, for example. In this case, a waning corresponding to the distance from the stopping vehicle 4 may be given.

Control other than emission of a warning to the driver may be performed for the vehicle 4. Various types of controls may be performed to allow the vehicle 4 to pass through the vicinity of a vehicle which has stopped safely.

Even when it is determined that the vehicle is out of the notice area, a warning is given for subsequent entry into the area B after continuous traveling.

The relation determination unit 50 described above may be configured to determine whether the self-vehicle is located before the different stopping vehicle in the traveling direction. In this case, the processing execution unit 51 may be configured to end execution of the foregoing process when the relation determination unit 50 determines that the self-vehicle is located before the different vehicle in the traveling direction.

The exit determination unit 52 determines whether the vehicle 4 has exited from the specific range 103. Arbitrary methods for determining the exit from the specific range 103 may be used, such as determination based on comparison between the self-vehicle position and map information on the specific range stored beforehand, and determination based on information received from ETC, DSRC, beacons or other signal transmission devices provided in the boundary areas 102. Accordingly, determination may be made by a method similar to the method of the entry determination unit 44.

The exit signal transmission unit 53 transmits an exit signal including the specifying information to the server device 2 when the exit determination unit 52 determines that the vehicle 4 has exited from the specific range 103.

The deletion control unit 66 of the server device 2 deletes, from the vehicle information storage unit 61, the traveling area information associated with the specifying information included in the exit signal when receiving the exit signal transmitted from the exit signal transmission unit 53.

[1-3. Processing]

A specific processing example performed by the reporting system 1 is hereinafter described. According to the present embodiment, the reporting system 1 notifies vehicles around the reporting system 1 when a vehicle traveling on a predetermined highway stops traveling.

(1) Vehicle Side Main Process

A vehicle side main process executed by the CPU 32 of the information processing device 31 is hereinafter described with reference to a flowchart shown in FIG. 5. This process presented by way of example starts in response to a start of traveling of a vehicle (state where vehicle speed exceeds predetermined threshold).

In S1, the CPU 32 determines whether the self-vehicle has passed through a predetermined entrance ETC gate of a predetermined highway. When it is determined that the self-vehicle has not passed through the entrance ETC gate yet (S1: NO), S1 is repeated. In other words, the CPU 32 waits until passage through the entrance ETC gate. When it is determined that the self-vehicle has passed through the entrance ETC gate (S1: YES), the process shifts to S2.

In S2, the CPU 32 starts a stop determination process. The stop determination process is executed in parallel with the on-going process. The stop determination process will be detailed below.

In S3, the CPU 32 stores an IC name. In a case of a shift from a highway not requiring notification by the reporting system 1 to a highway requiring notification by the reporting system 1 after passage through a JCT (junction), a JCT name is stored instead of an IC name.

At the time of a shift from S2 to S3, an IC name is acquired based on ETC information. On the other hand, at the time of a shift from S12 to S3, an IC name or a JCT name is acquired as a result of determination of passage through the corresponding IC or JCT based on the traveling position of the self-vehicle specified with reference to map matching. The passage in this context includes traveling on a main line without passing through an IC or a JCT as well.

In S3, the CPU 32 stores the acquired information as information for specifying a road on which the self-vehicle is traveling (road ID), and information for specifying an area in which the self-vehicle on the road is traveling (specific range ID).

In S4, the CPU 32 determines an inbound direction or an outbound direction as the traveling direction of the self-vehicle, and stores the determined direction. The traveling direction may be determined based on a change of the self-position with an elapse of time.

In S5, the CPU 32 transmits an entry signal to the server device 2. The entry signal includes traveling area information, and information for specifying the information processing system 5 (information processing device 31) (vehicle ID). The traveling area information is information including the road ID, the specific range ID, and the traveling direction described above.

Figure 6:
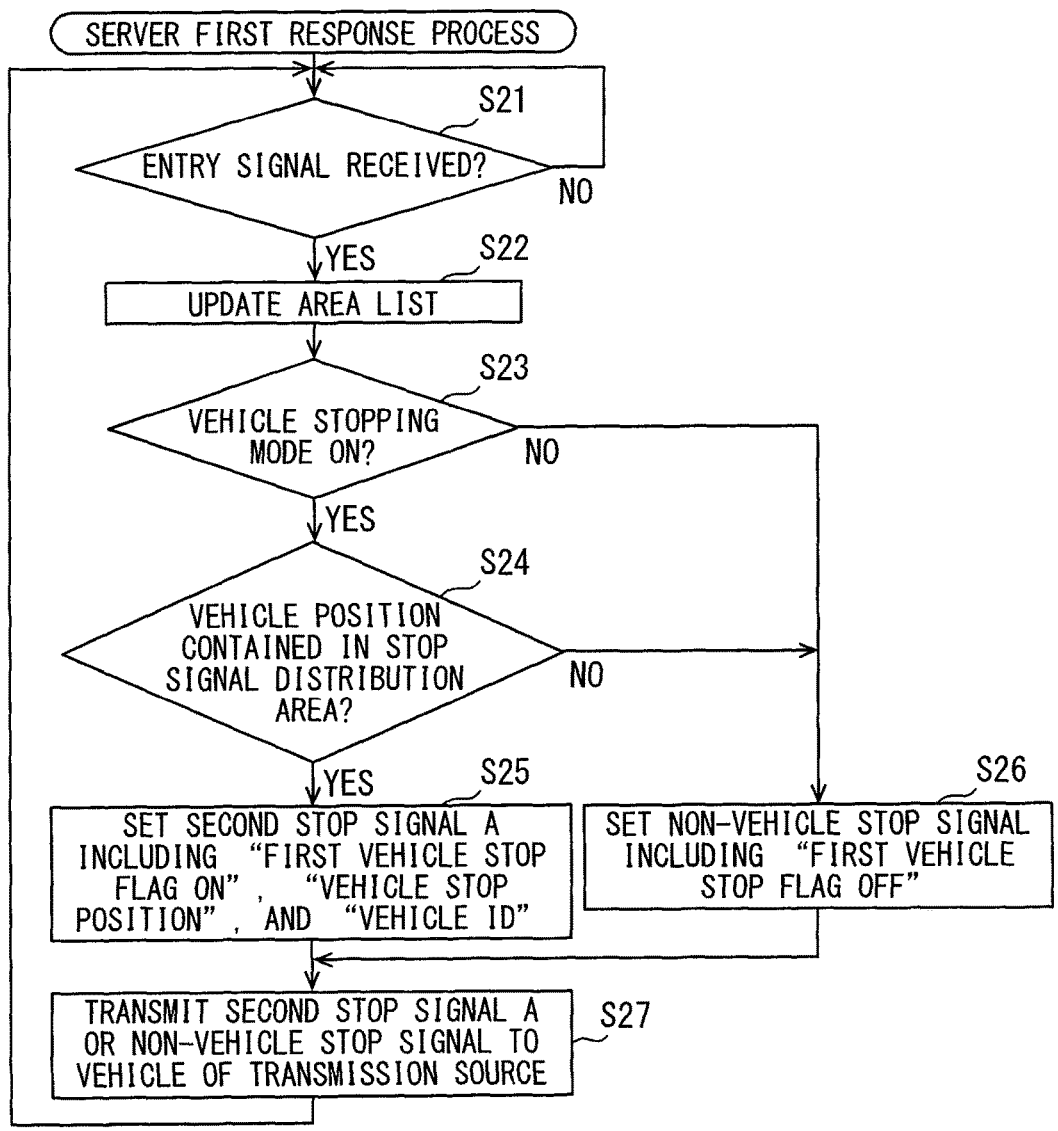
FIG. 6 is a flowchart showing a server first response process according to a first embodiment.

The server device 2 having received the traveling area information transmits, to the information processing system 5 of the corresponding vehicle, a second stop signal A including information on a first vehicle stop flag for indicating whether the stopping vehicle is present within an area set based on the traveling area information (S27 in FIG. 6). According to the example illustrated in FIG. 4, the areas A to C may be determined as the foregoing area when the vehicle 4d stops traveling. The area may be set together with distinction of the traveling direction.

In S6, the CPU 32 receives the second stop signal A from the server device 2. The CPU 32 sets the first vehicle stop flag to the on-state or off-state based on the information on the first vehicle stop flag.

In S7, the CPU 32 determines whether the first vehicle stop flag is in the off-state. When it is determined that the first vehicle stop flag is in the off-state (S7: YES), i.e., when the stopping vehicle is absent in the predetermined area, the process shifts to S8. When it is determined that the first vehicle stop flag is not in the off-state (S7: NO), i.e., the flag is in the on-state, the process shifts to S10.

In S8, the CPU 32 checks whether a new second stop signal B transmitted from the server device 2 is present. The second stop signal B is a signal transmitted from the server device 2 when a new vehicle stop occurs (S50 in FIG. 9), and includes a second vehicle stop flag indicating whether the stopping vehicle is present. When it is determined that the second stop signal B has been received, the second vehicle stop flag is set to the on-state.

In S9, the CPU 32 determines whether the second vehicle stop flag is in the off-state. When the second vehicle stop flag is in the off-state (S9: YES), i.e., when the stopping vehicle is absent in the predetermined area, the process shifts to S11. On the other hand, when it is determined that the second vehicle stop flag is not in the off-state (S9: NO), i.e., when the flag is in the on-state, the process proceeds to S10.

In S10, the CPU 32 starts a warning process. The warning process is executed in parallel with the on-going process. The warning process will be detailed below.

In S11, the CPU 32 determines whether the self-vehicle has passed through a boundary area. The boundary area is a boundary between a plurality of areas corresponding to divisions of the traveling highway, and may correspond to a place of a JCT or an IC, or in the vicinity of these. The CPU 32 makes this determination based on a state where the self-vehicle position has passed through the boundary area with reference to GPS information, or reception of a signal from a fixed short-distance wireless communication device such as ETC, for example.

According to the example illustrated in FIG. 4, an IC is positioned at each of the boundary areas 102a, 102c, and 102d, while a JCT is positioned at the boundary area 102b. In S11, passage through any one of the boundary areas 102 is determined.

When it is determined that the the self-vehicle has passed through the boundary area (S11: YES), the process shifts to S12. When it is determined that the self-vehicle has not passed through the boundary area yet (S11: NO), the process returns to S8.

In S12, the CPU 32 determines whether the self-vehicle has passed through an exit ETC gate of the highway. When it is determined that the self-vehicle has not passed through the exit ETC gate (S12: NO) yet, i.e., when the self-vehicle passes through the boundary area and enters a different area in the highway, the process returns to S3. In this case, a new specific range ID is given in S3.

When it is determined that the self-vehicle has passed through the exit ETC gate (S12: YES), i.e., when the self-vehicle passes through the boundary area and leaves the highway, the process shifts to S13.

In S13, the CPU 32 deletes ID information on the IC and JCT, and information on the traveling direction stored in S3 and S4. The CPU 32 further transmits an exit signal indicating the necessity of deletion of the foregoing information to the server device 2. The server device 2 deletes the traveling area information transmitted in S5.

In S14, the CPU 32 ends the stop determination process started in S2, and the warning process started in S10. Thereafter, the process returns to S1.

(2) Server First Response Process

A server first response process executed by the CPU 11 of the server device 2 is hereinafter described with reference to a flowchart in FIG. 6. This process is continuously executed during operation of the server device 2.

Figure 5:
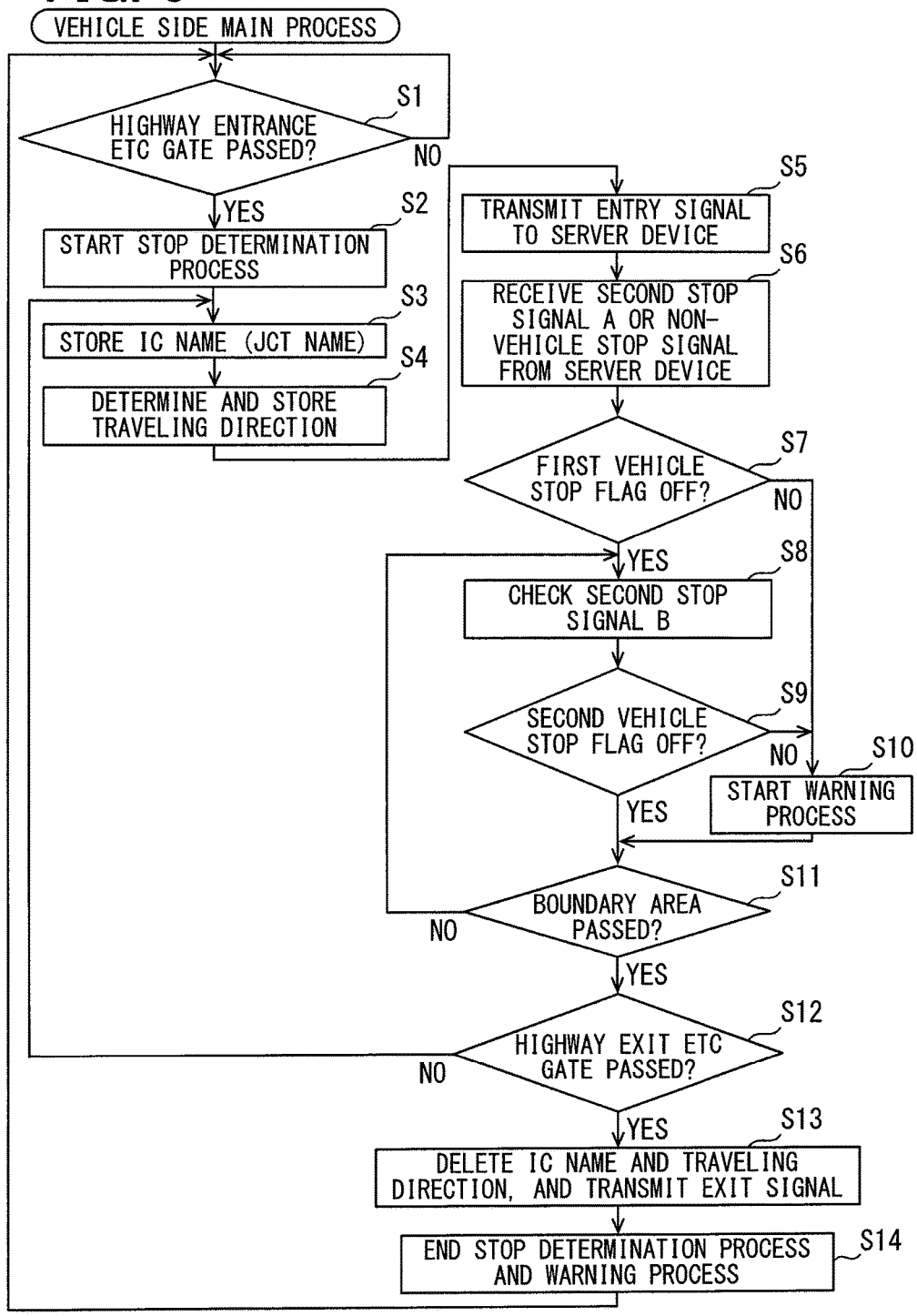
FIG. 5 is a flowchart showing a vehicle side main process according to a first embodiment.

In S21, the CPU 11 checks reception of an entry signal (traveling area information and vehicle ID) transmitted to the server device 2 from the information processing device 31 carried on any one of the vehicles in S5 in FIG. 5. When it is determined that the entry signal has not been received yet (S21: NO), S21 is repeated. In other words, the CPU 11 waits until reception of the entry signal. When it is determined that the entry signal has been received (S21: YES), the process shifts to S22.

Figure 7:
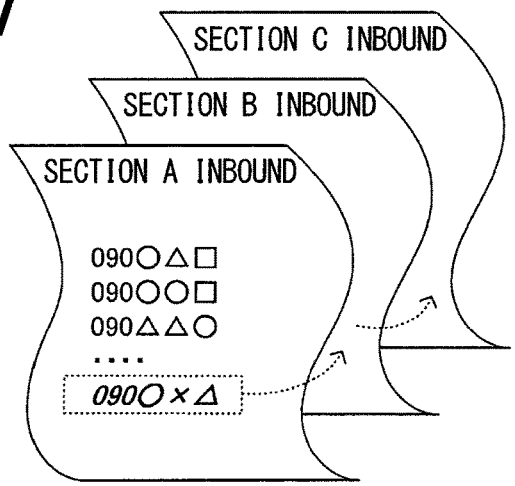
FIG. 7 is a view illustrating area lists.

In S22, the CPU 11 updates an area list based on information received in S21. As illustrated in FIG. 7, the area list is a list for traveling management created for each of areas as divisions of the specific range 103 divided in consideration of the traveling direction as well. The area list stores vehicle IDs of vehicles traveling in the corresponding area. Accordingly, the area list itself includes a road ID, a specific range ID, and traveling direction information. The area lists are stored in the vehicle information storage unit 61.

The CPU 11 specifies a traveling area based on the traveling area information in S22, and stores vehicle IDs (telephone numbers in FIG. 7) included in the area list of the corresponding area. An entry signal is similarly transmitted when a vehicle shifts to a different area. In this case, the corresponding vehicle ID shifts to the different area list as indicated by arrows in FIG. 7.

For storage of vehicle IDs, vehicle IDs are set such that a newer vehicle ID is stored with lower priority. The priority in this context is the order of transmission of the second stop signal B in S50 in FIG. 9 described below.

In S23, the CPU 11 determines whether the server is in a vehicle stopping mode. The vehicle stopping mode refers to a state where a vehicle stop occurs in the specific range 103 managed by the server device 2, producing the on-state of a predetermined flag. The vehicle stopping mode is turned on in S51 in FIG. 9.

When the server is in the vehicle stopping mode (S23: YES), the process shifts to S24. When the server is not in the vehicle stopping mode (S23: NO), the process shifts to S26.

In S24, the CPU 11 determines whether the position of the vehicle specified based on traveling area information included in the entry signal received in S21 is present within a stop signal distribution area. More specifically, it is determined whether an area flag has been set to the on-state in S46 in FIG. 9 described below in the area list after update of vehicle IDs in S22.

When the position of the vehicle is present within the stop signal distribution area (S24: YES), the process shifts to S25. When the position of the vehicle is absent in the stop signal distribution area (S24: NO), the process shifts to S26.

In S25, the CPU 11 sets a second stop signal A including information for setting the first vehicle stop flag to the on-state, information indicating the vehicle stop position corresponding to a trigger for turning on the vehicle stopping mode, and the vehicle ID of the corresponding vehicle. Thereafter, the process shifts to S27.

In S26, the CPU 11 sets a non-vehicle stop signal including information for setting the first vehicle stop flag to the off-state. Thereafter, the process shifts to S27.

In S27, the second stop signal A or the non-vehicle stop signal is transmitted to the vehicle (information processing device 31) corresponding to a transmission source of the traveling area information received in S21. Thereafter, the process returns to S21.

(3) Stop Determination Process

Figure 8:
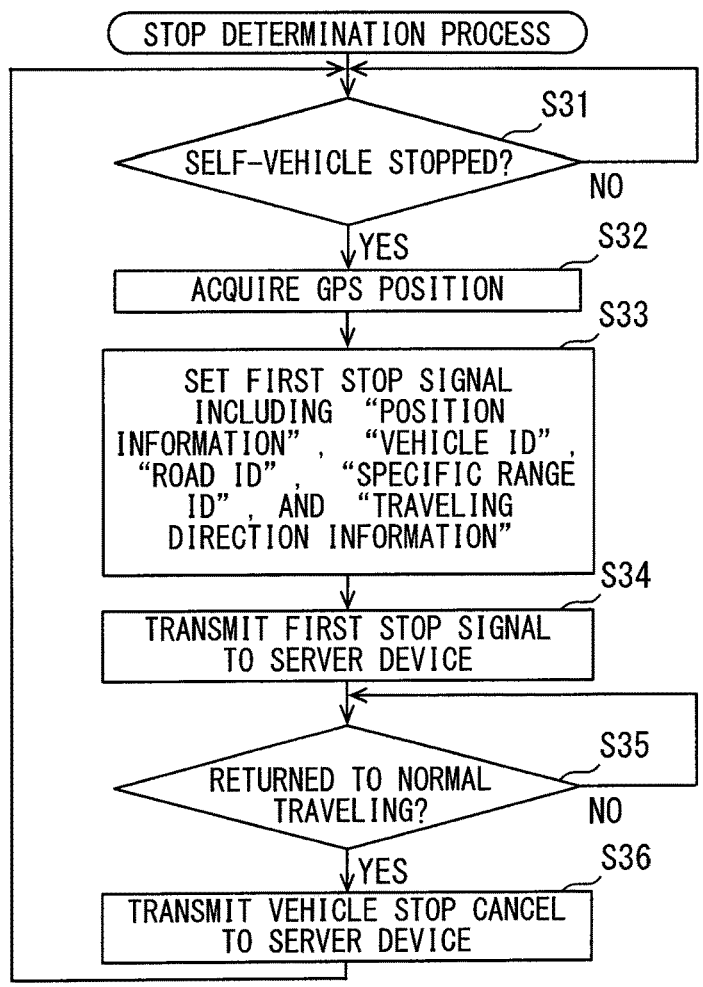
FIG. 8 is a flowchart showing a stop determination process according to the first embodiment.

A stop determination process executed by the CPU 32 of the information processing device 31 is hereinafter described with reference to a flowchart shown in FIG. 8. This process starts in S2 of the vehicle side main process in FIG. 5.

In S31, the CPU 32 determines whether the self-vehicle has stopped traveling. In this example, a stop of the self-vehicle is determined based on a state where the traveling speed of the self-vehicle is 5 km/h or lower. When it is determined that the self-vehicle is not stopping (S31: NO), S31 is repeated. In other words, the CPU 32 waits until a stop of the self-vehicle. When it is determined that the self-vehicle has stopped (S31: YES), the process shifts to S32.

In S32, the CPU32 acquires GPS position information. This position information is information on the latitude and longitude of the stop position.

In S33, the CPU 32 sets a first stop signal including GPS position information acquired in S32, a vehicle ID, latest road ID and specific range ID acquired in the latest step in S3, and traveling direction information acquired in the latest step in S4.

In S34, the CPU 32 transmits the first stop signal set in S33 to the server device 2.

In S35, the CPU 32 determines whether traveling of the self-vehicle has re-started. In this example, a re-start of traveling is determined based on a state where the traveling speed of the self-vehicle is 30 km/h or higher. When it is determined that traveling has not been re-started yet (S35: NO), S35 is repeated. In other words, the CPU 32 waits until a re-start of the self-vehicle. When it is determined that traveling has been re-started (S35: YES), the process shifts to S36.

In S36, the CPU 32 transmits information indicating vehicle stop cancel to the server device 2. The information indicating vehicle stop cancel includes the vehicle ID, based on which information the server device 2 recognizes canceling of the stop of the vehicle corresponding to the vehicle ID. After S36, the process returns to S31.

(4) Server Second Response Process

Figure 9:
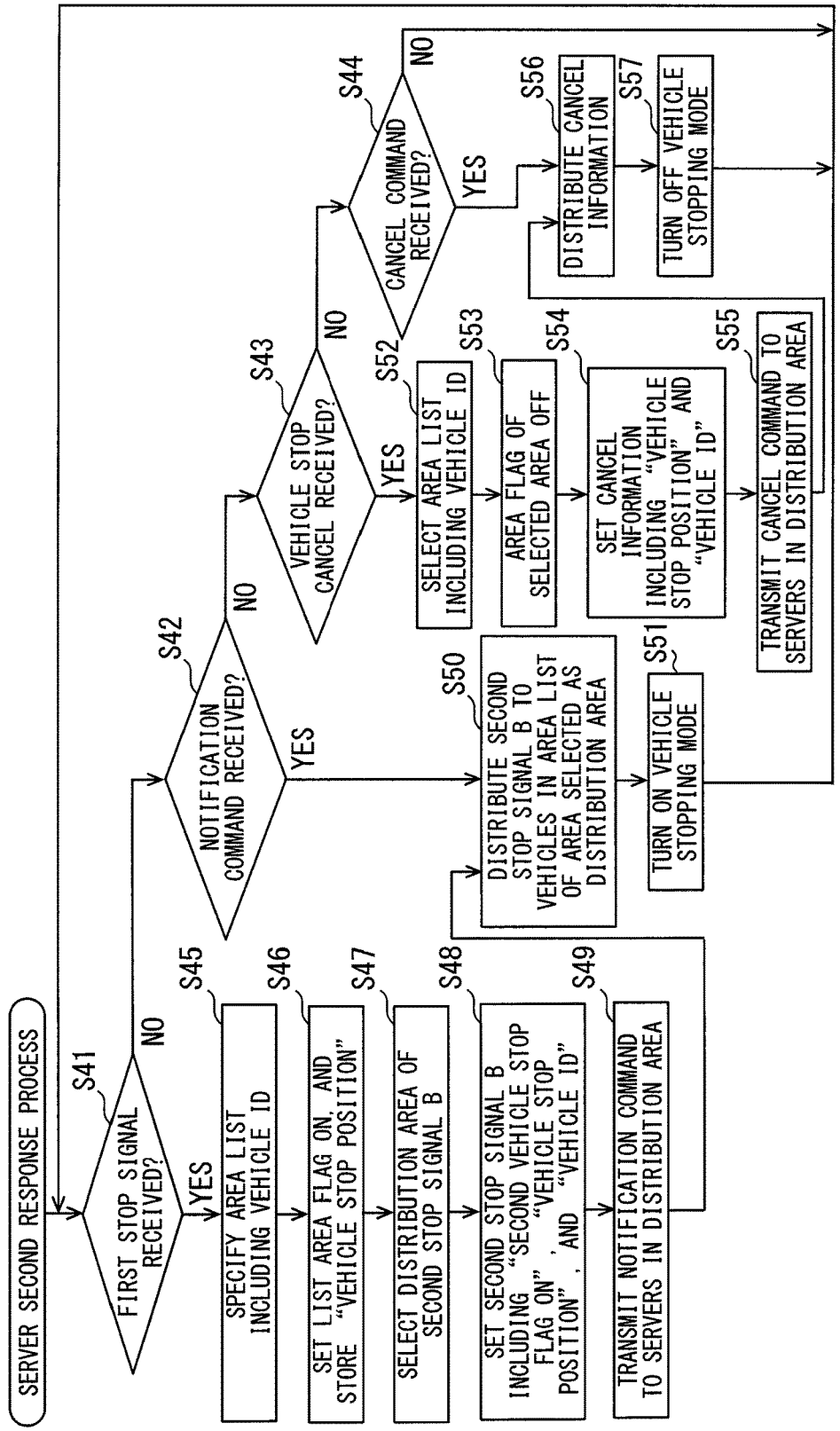
FIG. 9 is a flowchart showing a server second response process according to a first embodiment.

A server second response process executed by the CPU 11 of the server device 2 is hereinafter described with reference to a flowchart shown in FIG. 9. This process is continuously executed during operation of the server device 2.

In S41, the CPU 11 determines whether a first stop signal has been received. The first stop signal is transmitted from the information processing device 31 in S34 of the stop determination process. When it is determined that the first stop signal has been received (S41: YES), the process shifts to S45. When it is determined that the first stop signal has not been received yet (S41: NO), the process shifts to S42.

In S42, the CPU 11 determines whether a notification command has been received. The notification command is transmitted from the different server device 2 in S49 described below. When it is determined that the notification command has been received (S42: YES), the process shifts to S50. When it is determined that the notification command has not been received yet (S42: NO), the process shifts to S43.

In S43, the CPU 11 determines whether information indicating vehicle stop cancel has been received. The vehicle stop cancel is transmitted from the information processing device 31 in S36 of the stop determination process. When it is determined that information indicating vehicle stop cancel has been received (S43: YES), the process shifts to S52. When it is determined that information indicating vehicle stop cancel has not been received yet (S43: NO), the process shifts to S44.

In S44, the CPU 11 determines whether a cancel command has been received. The cancel command is transmitted from the different server device 2 in S55 described below. When it is determined that the cancel command has been received (S44: YES), the process shifts to S54. When it is determined that the cancel command has not been received yet (S44: NO), the process returns to S41.

In S45, the CPU 11 specifies, from a plurality of area lists, an area list containing the vehicle ID (telephone number) of the first stop signal determined as a received signal in S41.

In S46, the CPU 11 sets an area flag of the area list specified in S45 to the on-state. The area flag is a flag set to the on-state when a vehicle stop occurs in the corresponding area. In S46, GPS position information included in the received first stop signal is stored in the area list in association with the vehicle ID as information indicating the stop position.

In S47, the CPU 11 selects a distribution area of a second stop signal B. This distribution area is determined beforehand in correspondence with the area list whose area flag has been set to the on-state in S46. More specifically, selected in this step are the area corresponding to the foregoing area list, and an area located behind the selected area in the traveling direction, i.e., an area where a vehicle is traveling toward the place of the stopping vehicle.

In S48, the CPU 11 sets a second stop signal B including information for setting the second vehicle stop flag to the on-state, and the stop position information and the vehicle ID included in the first stop signal.

In S49, the CPU 11 transmits a notification command to the server device 2 located in the distribution area selected in S46. The notification command is a command requiring the corresponding server device 2 to transmit the second stop signal B. Accordingly, the server device 2 having received the notification command in S42 transmits the second stop signal B even when a vehicle stop occurs in an area other than the distribution area corresponding to the server device 2.

In S50, the CPU 11 distributes the second stop signal B to vehicles present within the area list of the area selected as the distribution area. In other words, the vehicles within the area list correspond to vehicles (information processing devices 31) having vehicle IDs registered in the area list. The second stop signal B is distributed by utilizing telephone lines in the order of distribution priority set in the area list.

In S51, the CPU 11 turns on the vehicle stopping mode. Thereafter, the process returns to S41.

A process in S52 is executed when it is determined that information indicating vehicle stop cancel has been received in S43. In S52, the CPU 11 selects, from the plurality of area lists, an area list containing the vehicle ID included in the information indicating vehicle stop cancel determined as received information in S43.

In S53, the CPU 11 sets the area flag of the area list selected in S52 to the off-state. In this step, the CPU 11 further deletes GPS position information stored in the area list in S46.

In S54, the CPU 11 sets cancel information including the stop position and the vehicle ID of the vehicle corresponding to the transmission source of the vehicle stop cancel signal received in S43. The cancel information is information indicating that the stopping vehicle is absent. The information processing device 31 stops control executed based on the presence of the stopping vehicle, such as a warning, in response to a trigger of reception of the foregoing cancel information.

In S55, the CPU 11 transmits a cancel command to the server device 2 located in the distribution area corresponding to the area list selected in S52 (i.e., distribution area previously selected in S47 based on the stop of the vehicle having the same vehicle ID). The cancel command is a command for transmitting cancel information to the corresponding server device 2.

In S56, the CPU 11 distributes the cancel information. The cancel information is distributed to the area selected in S47. The server device 2 distributes the cancel information to vehicles having vehicle IDs registered in the area list of the area corresponding to the server device 2.

In S57, the CPU 11 turns off the vehicle stopping mode. Thereafter, the process returns to S41.

(5) Warning Process

Figure 10:
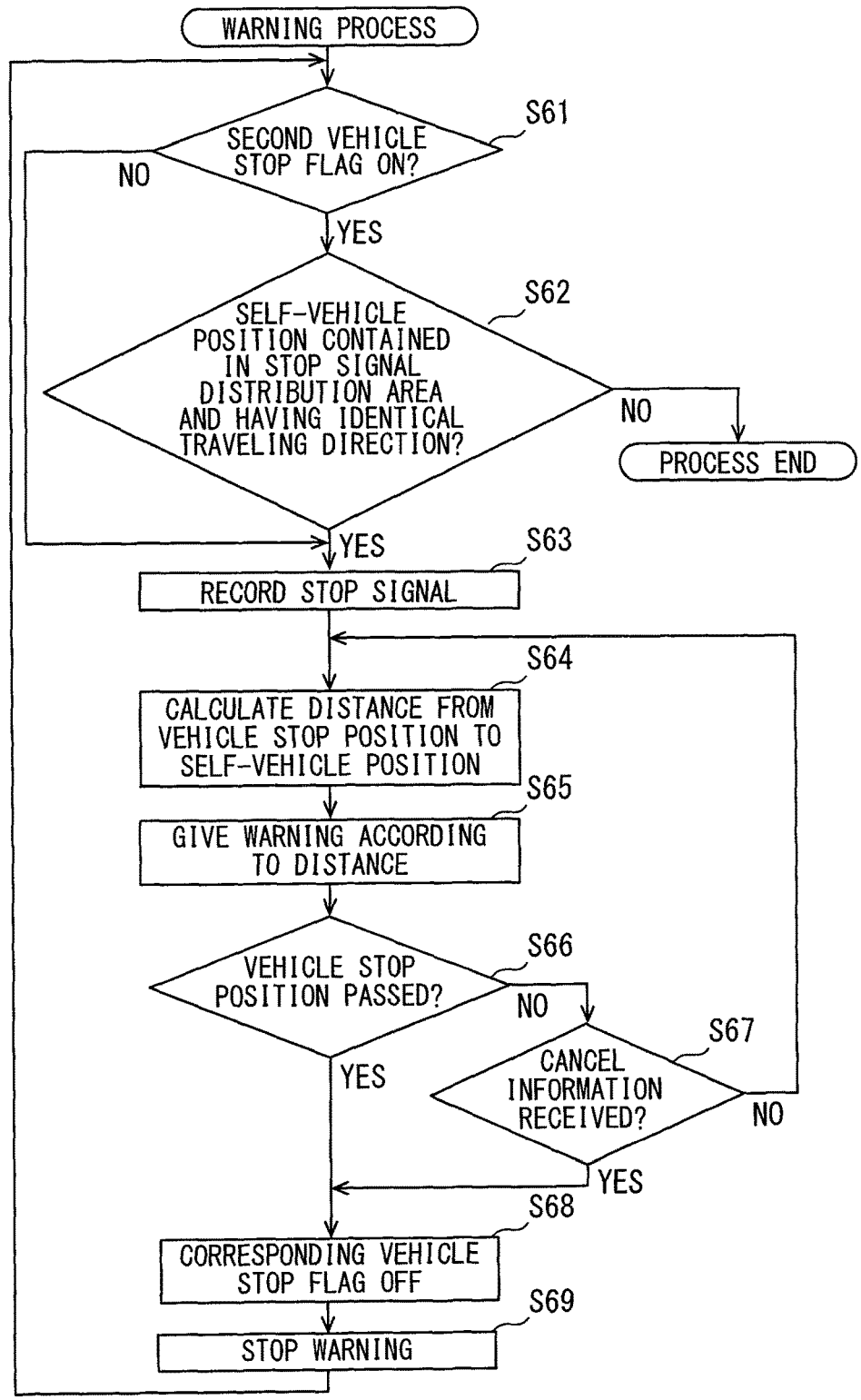
FIG. 10 is a flowchart showing a warning process according to the first embodiment.

The warning process executed by the CPU 32 of the information processing device 31 is hereinafter described with reference to FIG. 10. This process starts in S10 in the vehicle side main process in FIG. 5. At the start of the process, at least one of the first vehicle stop flag and the second vehicle stop flag is set to the on-state.

In S61, the CPU 32 determines whether the second vehicle stop flag is in the on-state. When the second vehicle stop flag is in the on-state (S61: YES), the process shifts to S62. When the second vehicle stop flag is not in the on-state (S61: NO), i.e., the first stop flag is in the on-state, the process shifts to S63.

In S62, the CPU 32 determines whether the self-vehicle is located within the distribution area of the stop signal, and whether the traveling direction is the identical direction, based on the second stop signal B received in S8 in FIG. 5. When the the traveling direction is the identical direction (S62: YES), the process shifts to S63. When it is determined that the traveling direction is not the identical direction (S62: NO), this process ends.

In S63, the CPU 32 stores the received stop signal. When the process shifts from S61 to S63, the second stop signal A received in S6 in FIG. 5 is stored. When the process shifts from S62 to S63, the second stop signal B received in S8 in FIG. 5 is stored.

In S64, the CPU 32 calculates the distance between the position of the self-vehicle and the stop position included in the stop signal stored in S63 based on the position of the self-vehicle and the stop position.

In S65, the CPU 32 gives a warning in accordance with the distance calculated in S64. Specific examples of the method for giving the warning include display of notification about occurrence of the vehicle stop on the display of the navigation system 25, and voice guidance from the speaker 26.

The CPU 32 further sets a color and a size of notification such that contents displayed on the display (such as characters) become more conspicuous as the distance decreases. The CPU 32 increases the volume of voices emitted from the speaker 26 as the distance decreases, and emits warning sound when the distance is short. Warning modes changeable in accordance with the distance may be realized in various ways as well as the foregoing examples.

Emission of a warning may be configured to stop when the calculated distance between the stop position and the self-vehicle position is shorter than a predetermined threshold.

In S66, the CPU 32 determines whether the self-vehicle has passed through the stop position of the different vehicle included in the stop signal stored in S63. When it is determined that the self-vehicle has passed through the stop position (S66: YES), the process shifts to S68. When it is determined that the self-vehicle has not passed through the stop position yet (S66: NO), the process shifts to S67.

In S67, the CPU 32 determines whether cancel information has been received. The cancel information is transmitted in S56 in FIG. 9. When it is determined that the cancel information has been received (S67: YES), the process shifts to S68. When it is determined that the cancel information has not been received (S67: NO), the process returns to S64.

In S68, the CPU 32 sets the vehicle stop flag to the off-state. More specifically, the CPU 32 changes the vehicle stop flag, which has been set to the on-state in correspondence with the vehicle stop, to the off-state based on the current state of the corresponding vehicle not requiring a warning. More specifically, when the process shifts from S66 to S68, i.e., when it is determined that the self-vehicle has passed through the stop position of the different vehicle, the vehicle stop flag associated with the stop position is set to the off-state. On the other hand, when the process shifts from S67 to S68, the vehicle stop flag associated with the vehicle ID included in the received cancel information is set to the off-state.

In S69, the CPU 32 stops warning. Thereafter, the process returns to S61.

[1-4. Advantageous Effects]

According to the first embodiment, the following advantageous effects are provided.

[1A] According to the reporting system 1 in the present embodiment, the area list for traveling management is created for each of areas as divisions of the specific range 103 divided in consideration of the traveling direction as well. Vehicle IDs of vehicles traveling in the corresponding area are stored in the area list. This structure decreases a processing load imposed on the server device 2 which searches for vehicles as transmission destinations of the second stop signal B. Accordingly, prompt transmission of the second stop signal is achievable.

[1B] According to the reporting system 1 in the present embodiment, specifying information is stored in the foregoing area list with priority determined in conformity to a predetermined standard. The second stop signal is transmitted to the information processing device 31 in accordance with the stored priority. Accordingly, signals are transmitted in an appropriate order, and therefore the probability of accidents further decreases. The priority may be determined by various methods as well as the method described above.

[1C] The reporting system 1 in the present embodiment determines whether the vehicle 4 has exited from the specific range 103, and transmits, to the server device 2, an exit signal corresponding to a signal including specifying information corresponding to information for specifying the information processing system 5 at the time of determination that the vehicle 4 has exited from the specific range 103. The server device 2 deletes, from the vehicle information storage unit 61, the traveling area information associated with the specifying information included in the exit signal at the time of reception of the exit signal.

Accordingly, the reporting system 1 decreases the possibility of erroneous transmission of the second stop signal to the information processing system 5 of the vehicle 4 having passed through the specific range. The deletion in this context is deletion from possible targets of transmission destinations. Accordingly, the information may be kept stored while excluded from transmission targets of the second stop signal at the time of a vehicle stop.

[2. Second Embodiment]

[2-1. Differences from First Embodiment]

A basic structure of a second embodiment is similar to the structure of the first embodiment. Accordingly, similar configurations are not repeatedly explained. Different points between these embodiments are only touched upon.

According to the first embodiment described above, traveling area information and a vehicle ID included in an entry signal received in S21 in the server first response process in FIG. 6 is classified for each area of a specific range and processed. According to the present embodiment, however, these information and signal are broadcasted to a predetermined range without classification for each area, and without transmission of a second stop signal B to a particular vehicle ID.

[2-2. Processing]

A specific processing example of the reporting system 1 according to the second embodiment is hereinafter described. Only a server first response process and a server second response process in this present embodiment are different from the respective processes in the first embodiment. Accordingly, other processes are not repeatedly explained herein.

(1) Server First Response Process

Figure 11:
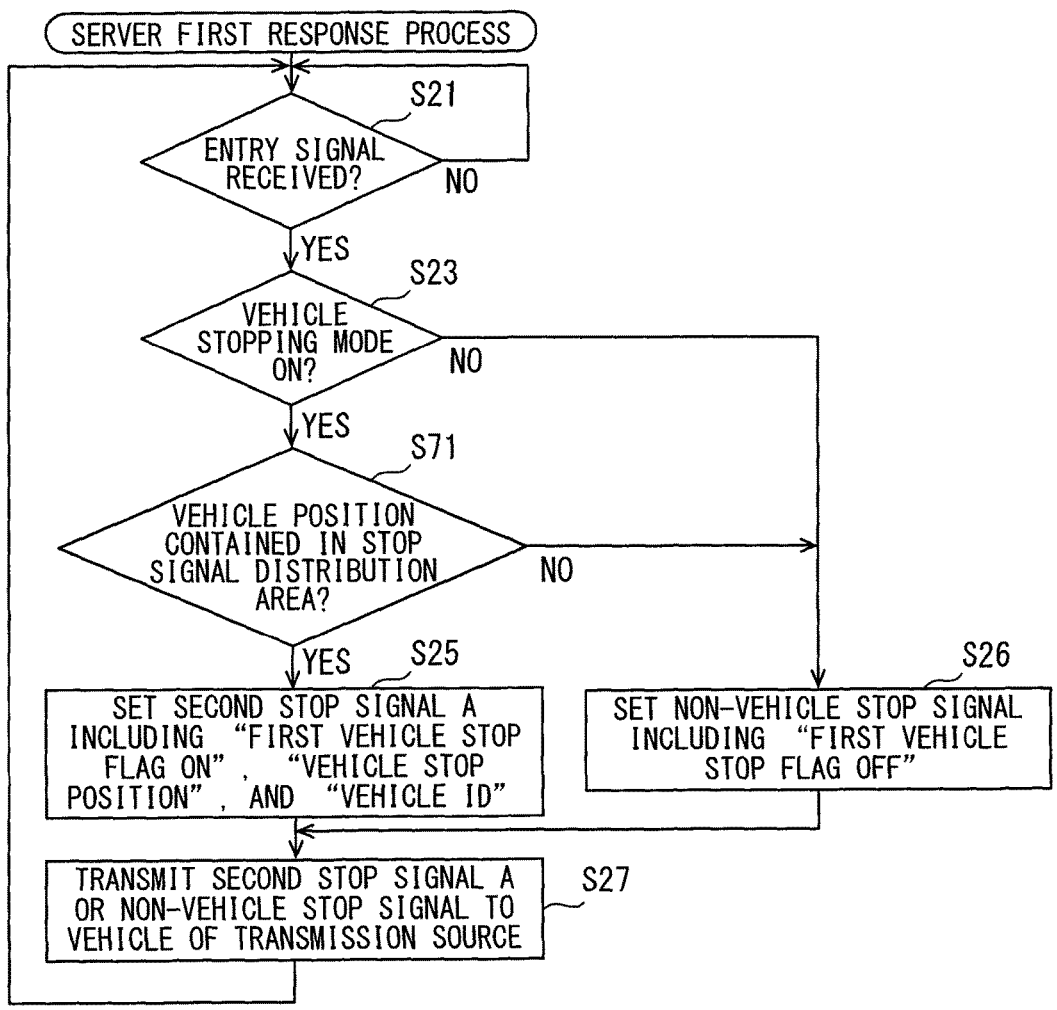
FIG. 11 is a flowchart showing a server first response process according to a second embodiment.

A server first response process executed by the CPU 11 of the server device 2 is hereinafter described with reference to a flowchart shown in FIG. 11. Steps in this process similar to the respective steps in the server first response process in FIG. 6 in the first embodiment are given similar reference numbers, and a part of explanation is omitted.

After S21 of the server first response process, the process shifts to S23 while skipping S22. When it is determined that the current mode is a vehicle stopping mode in S23 (S23: YES), the process shifts to S71.

In S71, the CPU 11 determines whether the position of the vehicle specified based on traveling area information included in an entry signal received in S21 is located within a stop signal distribution area. The stop signal distribution area is an area to which information indicating a vehicle stop is distributed at the time of occurrence of the vehicle stop in the specific range 103. The stop signal distribution area is set in S82 in FIG. 12 described below.

When the vehicle is located within the stop signal distribution area (S71: YES), the process shift to S25. When the vehicle is not located in the stop signal distribution area (S71: NO), the process shifts to S26.

(2) Server Second Response Process

Figure 12:
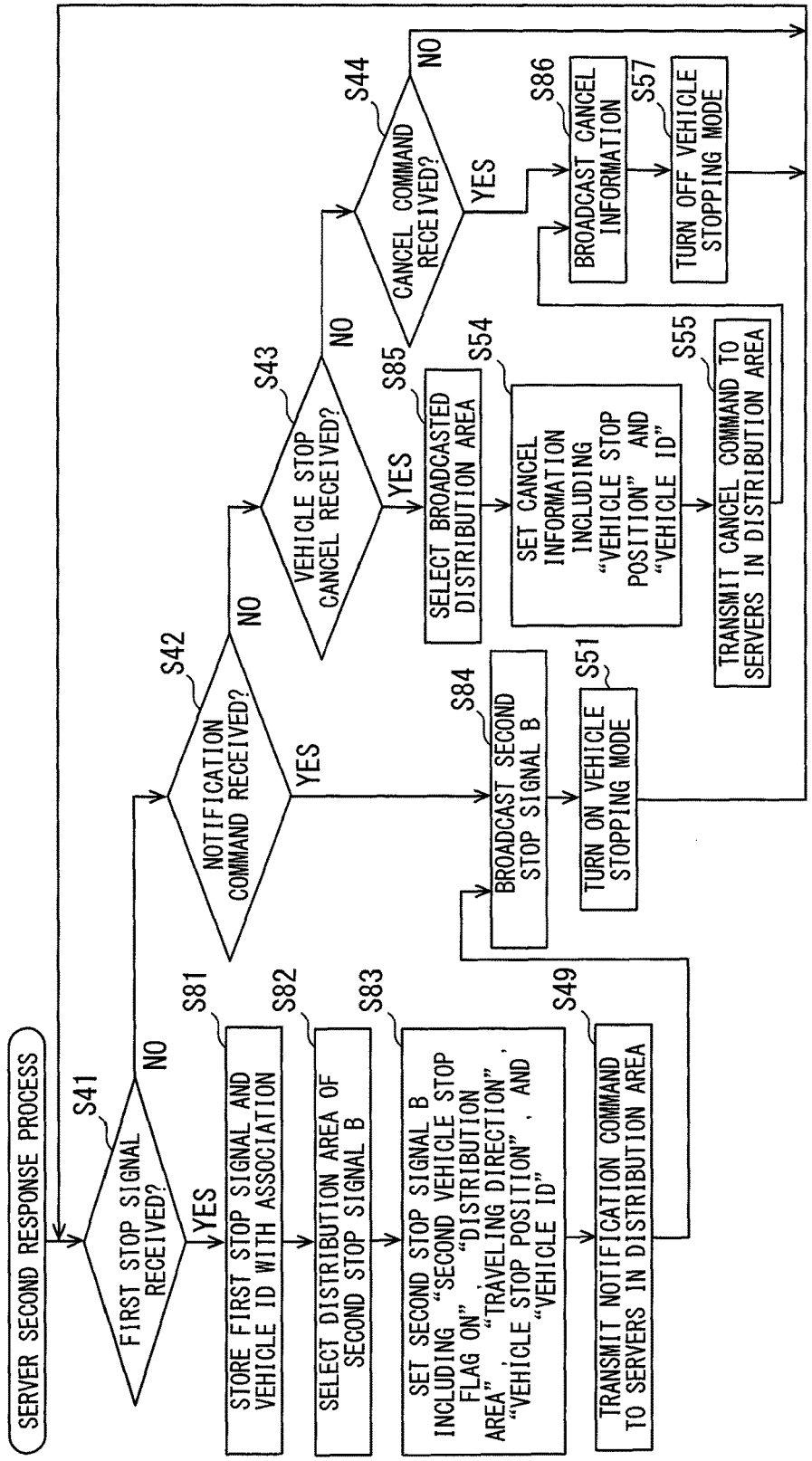
FIG. 12 is a flowchart showing a server second response process according to the second embodiment.

A server second response process executed by the CPU 11 of the server device 2 is hereinafter described with reference to a flowchart shown in FIG. 12. Steps in this process similar to the respective steps in the server second response process in FIG. 9 in the first embodiment are given similar reference numbers, and a part of explanation is omitted.

When it is determined that the first stop signal has been received (S41: YES) in S41, the process shifts to S81. When it is determined that the first stop signal has been received (S42: YES) in S42, the process shifts to S84. When it is determined that information indicating vehicle stop cancel has been received in S43 (S43: YES), the process shifts to S85. When it is determined that the cancel command has been received in S44 (S44: YES), the process shifts to S86.

In S81, the CPU 11 stores the first stop signal determined as a received signal in S41, and a vehicle ID of the information processing device 31 corresponding to a transmission source in association with each other.

In S82, the CPU 11 selects a distribution area for a second stop signal B.

Figure 13:
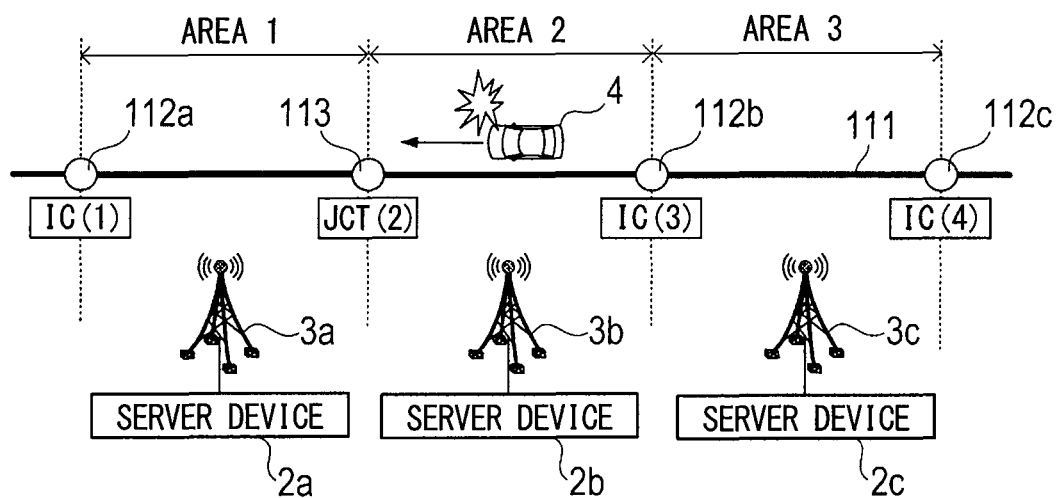
FIG. 13 is a view illustrating a method for selecting distribution areas.

A method for selecting the distribution area is hereinafter described with reference to FIG. 13. The vehicle 4 is a vehicle having stopped traveling on a highway 111. The highway 111 has a boundary located in each of areas where ICs 112 (112a to 112c) and a JCT 113 are provided. The highway 111 is divided into an area 1 ranging from an IC(1) to a JCT(2), an area 2 ranging from the JCT(2) to an IC(3), and an area 3 ranging from the IC(3) to an IC(4).

The signal transmission and reception device 3 (one of 3a to 3c) distributing signals is provided for each area. The signal transmission and reception device 3a distributes signals to the area 1. The signal transmission and reception device 3b distributes signals to the area 2. The signal transmission and reception device 3c distributes signals to the area 3. Needless to say, each of the signal transmission and reception devices 3a to 3c may distribute signals to an area exceeding the foregoing area, and produce an overlapping distribution range. Each of the server devices 2 (2a to 2c) is disposed adjacent to the corresponding signal transmission and reception device 3.

The vehicle 4 stops in the course of the area 2 in the direction toward the JCT(2). In this case, a vehicle present in the area 1 and located before the vehicle 4 in the traveling direction or on a road having a different traveling direction is in a low emergency state for receiving vehicle stop information. Accordingly, the distribution range is set to the areas 2 and 3, other than the area 1.

In S83, the CPU 11 sets a second stop signal B including information for setting a second vehicle stop flag to the on-state, the distribution areas, the traveling direction, and information on the stop position and the vehicle ID included in the first stop signal. Thereafter, the process shifts to S49.

After completion of S49, the process shifts to S84.

In S84, the CPU 11 broadcasts the second stop signal B. Thereafter, the process shifts to S51.

In S85, the CPU 11 selects the distribution areas selected in S82, i.e., the distribution areas having received broadcast transmission in S84. Thereafter, the process shifts to S54.

After completion of S55, the process shifts to S86.

In S86, the CPU 11 broadcasts cancel information. Thereafter, the process shifts to S57.

[2-3. Advantageous Effects]

[2A] According to the reporting system 1 in the present embodiment, the server device 2 sets a range to which a second stop signal is to be transmitted based on a signal transmitted from the information processing system 5, and transmits the second stop signal to this range. This structure eliminates the necessity for individually determining the position of the information processing system 5. Accordingly, prompt transmission of the second stop signal is achievable while reducing a processing load on the server device 2.

[3. Third Embodiment]

[3-1. Differences from Second Embodiment]

A basic structure of a third embodiment is similar to the structure of the second embodiment. Accordingly, similar configurations are not repeatedly explained. Different points between these embodiments are only touched upon.

According to the third embodiment, the transmission range setting unit 64b of the signal transmission destination setting unit 64 performs a function. When receiving a first stop signal transmitted from the first transmission unit 47, the transmission range setting unit 64b sets a range of a road to which a second stop signal B (stop position range) is transmitted at least based on traveling area information included in the first stop signal. The second transmission unit 65 broadcasts the second stop signal B generated by the signal generation unit 63 to the stop position range set by the transmission range setting unit 64b.

[3-2. Processing]

A specific processing example of the reporting system 1 according to the third embodiment is hereinafter described. Only a server second response process and a warning process in the present embodiment are different from the respective processes in the second embodiment. Accordingly, other processes are not repeatedly explained herein.

(1) Server Second Response Process

Figure 14:
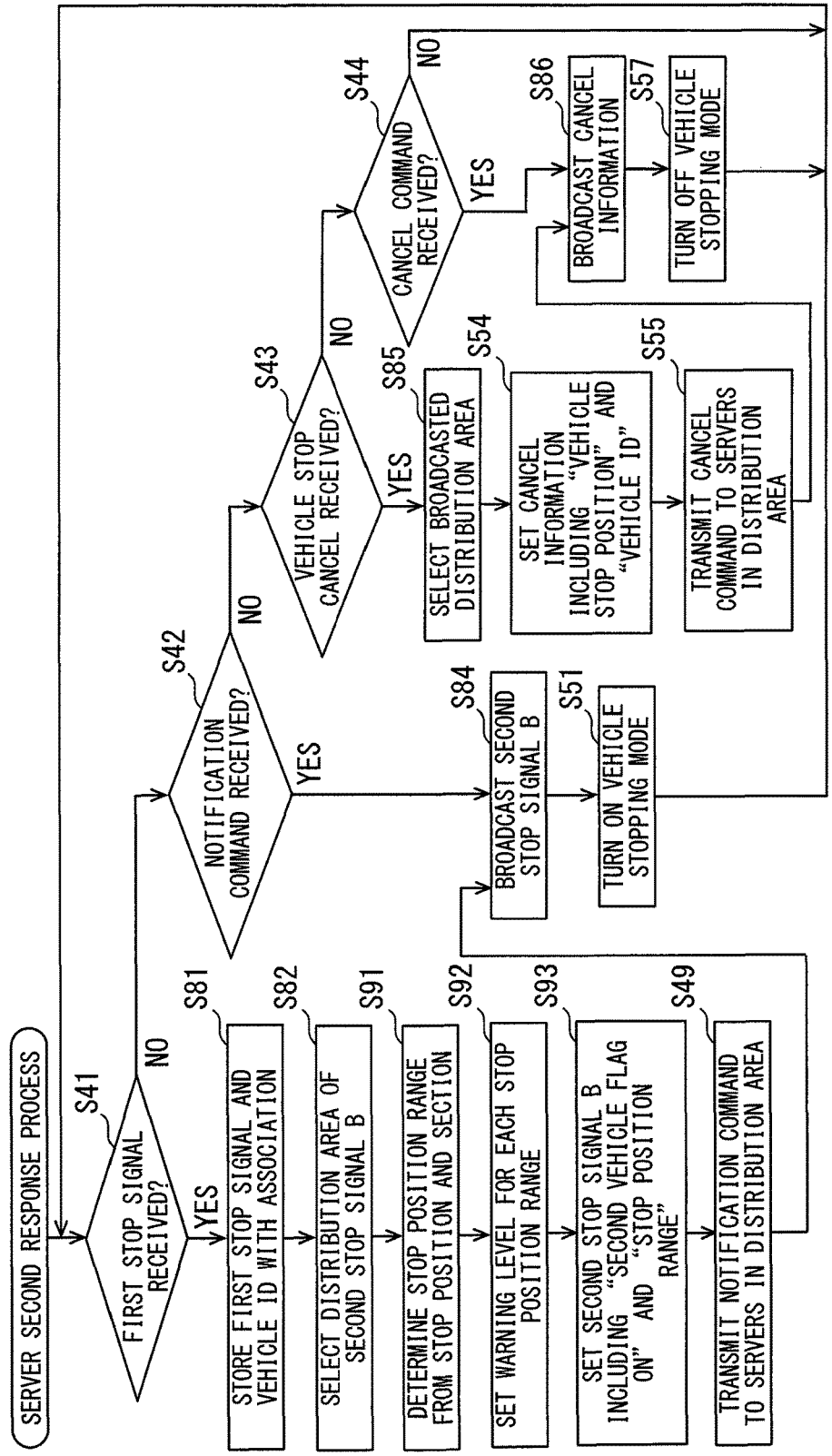
FIG. 14 is a flowchart showing a server second response process according to a third embodiment.

A server second response process executed by the CPU 11 of the server device 2 is hereinafter described with reference to a flowchart shown in FIG. 14. Steps in this process similar to the respective steps in the server second response process in FIG. 12 in the second embodiment are given similar reference numbers, and a part of explanation is omitted.

After a distribution area for receiving a second stop signal B is selected in S82, the process shifts to S91.

Figure 15:
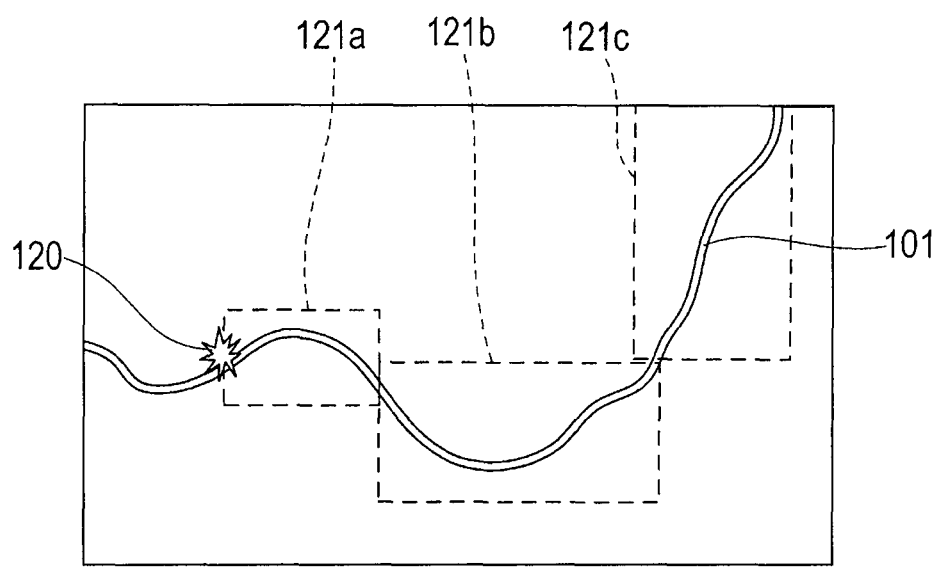
FIG. 15 is a view illustrating stop position ranges.

In S91, the CPU 11 determines a stop position range based on a stop position and a section. The stop position range is information indicating a fixed range and including information on the latitude and longitude. As illustrated in FIG. 15, three stop position ranges 121 constituted by a first range 121a, a second range 121b, and a third range 121c are set in the order from a starting point corresponding to a stop position 120 on the road 101 toward the rear.

Arbitrary methods for determining the stop position ranges may be used. The starting point of the ranges is not required to be located at the stop position, but may be a position away from the stop position with a distance left between the starting point and the stop position. The method for determining the stop position ranges may be selected for each of sections defined beforehand. For example, in a case of a section including many curves and requiring reduction of the traveling speed, each of the stop position ranges may be set to a small range. The stop position ranges may be specified based on information other than the latitude and longitude. The number of ranges may be other than three.

In S92, the CPU 11 determines a warning level for each stop position range. The warning levels are determined in accordance with the degree of danger. For example, the stop position range located close to the stop position has a high emergency level. However, the emergency level lowers as the distance from the stop position increases. Accordingly, appropriate warning levels are determined in accordance with the distance from the stop position.

In S93, the CPU 11 sets a second stop signal B including information for setting a second vehicle stop flag to the on-state, information on the stop position ranges each of which has a determined warning level, and a vehicle ID. Thereafter, the process shifts to S49. Information set herein includes all information on the stop position ranges (information on three stop position ranges in the present embodiment).

(2) Warning Process

Figure 16:
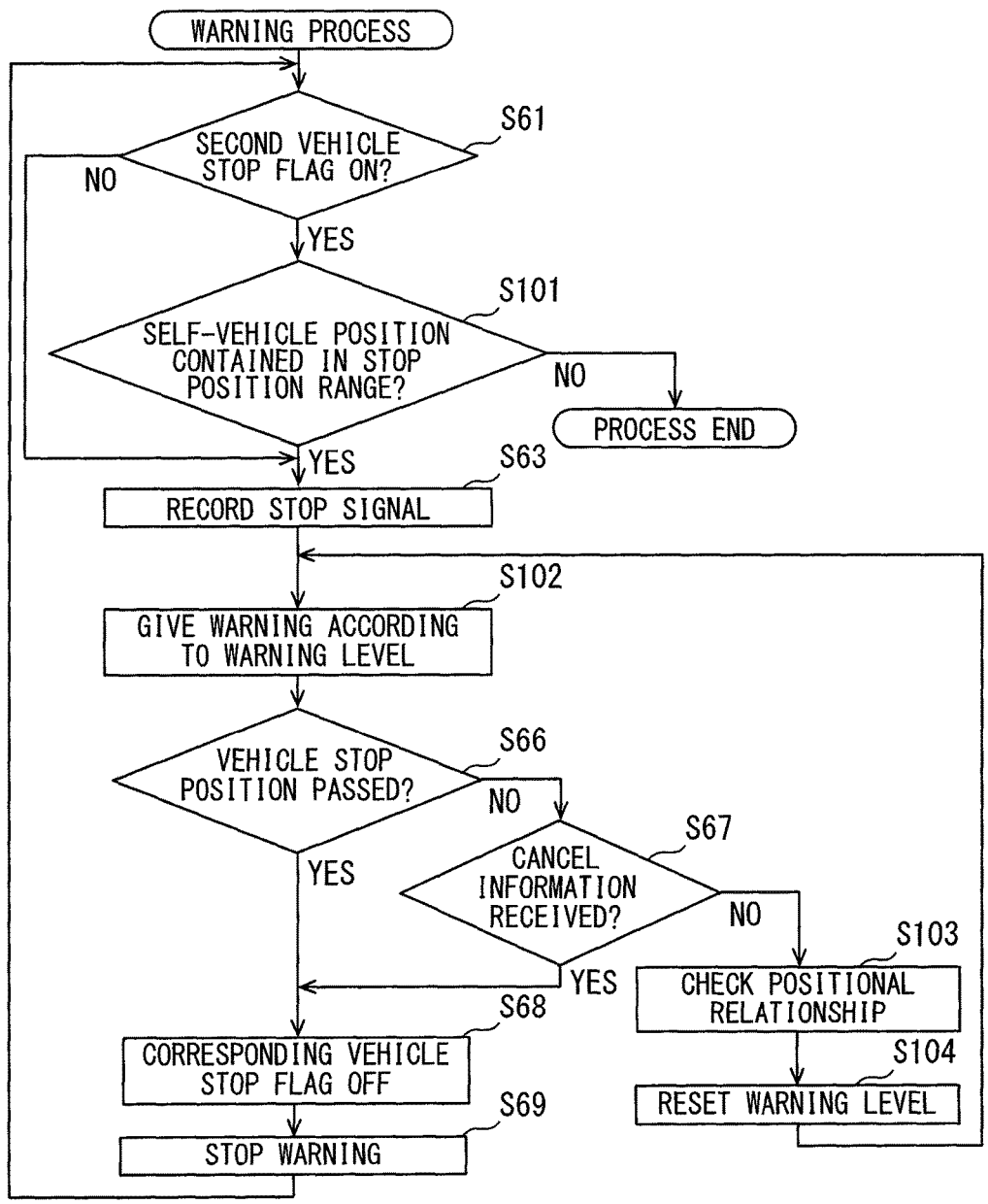
FIG. 16 is a flowchart showing a warning process according to the third embodiment.

The warning process executed by the CPU 32 of the information processing device 31 is hereinafter described with reference to FIG. 16. Steps in this process similar to the respective steps in the warning process in FIG. 10 in the first embodiment are given similar reference numbers, and a part of explanation is omitted.

When it is determined that a second vehicle stop flag is in the on-state in S61 (S61: YES), the process shifts to S101.

In S101, the CPU 32 determines whether the position of the self-vehicle is contained in any one of the stop position ranges included in the second stop signal B determined as a received signal in S8. More specifically, the CPU 32 determines whether the self-vehicle is located in any one of the stop position ranges 121 constituted by the first range 121a, the second range 121b, and the third range 121c in FIG. 15.

When the self-vehicle is located in any one of the ranges (S101: YES), the process shifts to S63. When the self-vehicle is not located in any one of the ranges (S101: NO), the on-going process ends.

After completion of S63, the process shifts to S102.

In S102, the CPU 32 gives a warning at a warning level set for the stop position range where the self-vehicle is located. Thereafter, the process shifts to S66.

When it is determined that cancel information has not been received yet in S67 (S67: NO), the process shifts to S103.

In S103, a positional relationship between the stop position range and the self-vehicle position is checked. The second stop signal B determined as a received signal in S8 includes a plurality of stop position ranges. Accordingly, a change of the position of the traveling self-vehicle from one range to a different range is detectable based on determination of the stop position range containing the self-vehicle.

In S104, the warning level is reset. When it is determined based on the check in S103 that the positional relationship between the stop position range and the self-vehicle position has been changed, the warning level is changed in accordance with the stop position range, and set as a new warning level. Thereafter, the process shifts to S102.

[3-3. Advantageous Effects]

[3A] According to the reporting system 1 in the present embodiment, a first stop signal transmitted from the information processing system 5 includes information indicating the current position of the vehicle 4. The server device 2 sets one or more stop position ranges according to the distance from a starting point corresponding to the current position of the vehicle based on the information included in the first stop position and indicating the current position, and generates a second stop signal B including information indicating the stop position range as information on the stop position of the vehicle.

The information processing system 5 determines whether the self-vehicle 4 is located in the foregoing range included in the received second stop signal B, and executes a process determined beforehand based on a determination result.

According to the notification system 1 thus configured, the server device 2 transmits only range information and information indicating warning levels. In this case, prompt transmission of the second stop signal B to the information processing system 5 is achievable. Moreover, the information processing system 5 is only required to determine whether the self-vehicle is contained in the transmitted stop position range. Accordingly, a processing load imposed on the information processing system 5 decreases.

[4. Other Embodiments]

Various other modes may be carried out as well as the embodiments presented herein by way of example.

[4A] According to the embodiments described above, a structure that performs the respective processes for a target of a vehicle traveling on a highway has been presented by way of example. However, the processes discussed above may be performed for a target traveling on a road other than a highway.

Figure 17:
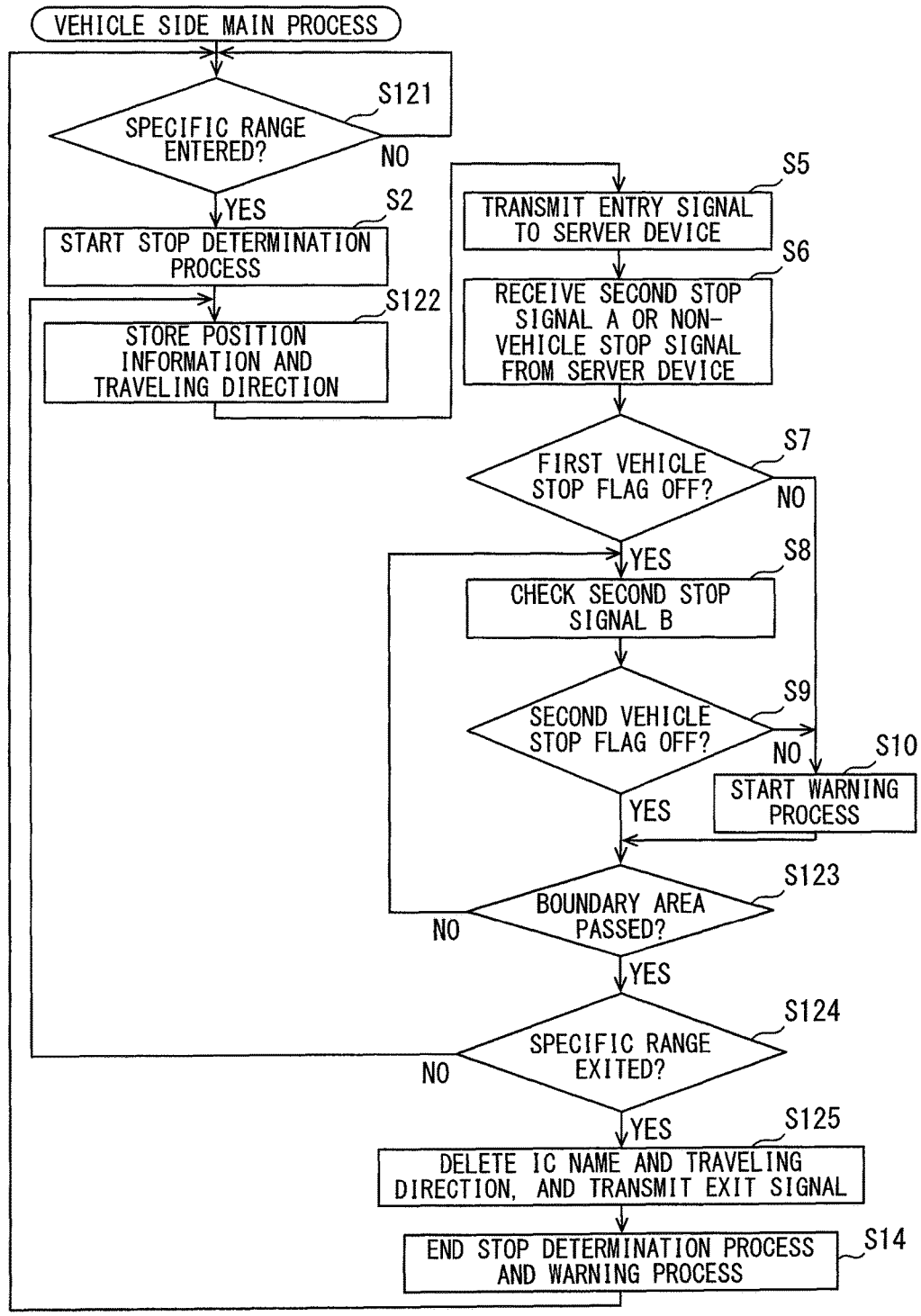
FIG. 17 is a flowchart showing a vehicle side main process according to another embodiment.

An example of a vehicle side main process performed in this situation is hereinafter described with reference to a flowchart shown in FIG. 17. Steps in this process similar to the respective steps in the vehicle side main process in FIG. 5 in the first embodiment are given similar reference numbers, and a part of explanation is omitted.

In S121, the CPU 32 determines whether a self-vehicle has entered a specific range. Methods for this determination may be arbitrarily determined, such as determination based on comparison between GPS information indicating the self-vehicle position and map information indicating a specific range (map matching), and determination based on information received from ETC, DSRC, beacons or other signal transmission devices.

When it is determined that the self-vehicle has not entered the specific range (S121: NO), S121 is repeated. When it is determined that the self-vehicle has entered the specific range (S121: YES), the process shifts to S2.

After completion of S2, the process shifts to S122.

In S122, the CPU 32 acquires and stores traveling range information including position information for specifying the road and the specific range, and traveling area information including a traveling direction. Thereafter, the process shifts to S5. The method for specifying the road and the specific range may be similar to the method used in S121. The traveling direction may be determined based on a change of the self-vehicle position with an elapse of time, or information received from a signal transmission device that transmits signals only to vehicles traveling one of traveling directions.

When it is determined that a second vehicle stop flag is in the off-state in S9 (S9: YES), or after completion of S10, the process shifts to S123.

In S123, the CPU 32 determines whether the self-vehicle has passed through a boundary area. Arbitrary methods for setting the boundary area may be used. For example, an arbitrary spot may be set to a boundary area, or a boundary area may be set at each of fixed intervals. Passage through the boundary area may be determined by a method similar to the method in S121.

When it is determined that the self-vehicle has passed through the boundary area (S123: YES), the process shifts to S124. When it is determined that the self-vehicle has not passed through the boundary area yet (S123: NO), the process returns to S8.

In S124, the CPU 32 determines whether the self-vehicle has left the specific range. When it is determined that the self-vehicle has not left the specific range yet (S124: NO), the process returns to S122. When it is determined that the self-vehicle has left the specific range (S124: YES), the process shifts to S125. The leaving from the specific range may be determined by a method similar to the method in S121.

In S125, the CPU 32 deletes the traveling area information stored in S122, and transmits, to the server device 2, an exit signal indicating the necessity of deletion of the traveling area information. Thereafter, the process shifts to S14.

The reporting system 1 thus configured may be adopted for various types of roads as well as a highway.

[4B] According to the embodiments described above, position information acquired by the position detection unit 42 and indicating a stop position of the vehicle 4 is included in the first and second stop signals A and B for transmission and reception. However, the signal indicating the stop position of the vehicle 4 is not required to be transmitted. When the area of the specific range 103 is set to a narrow area, for example, a specific range ID may be used instead of position information.

Figure 18:
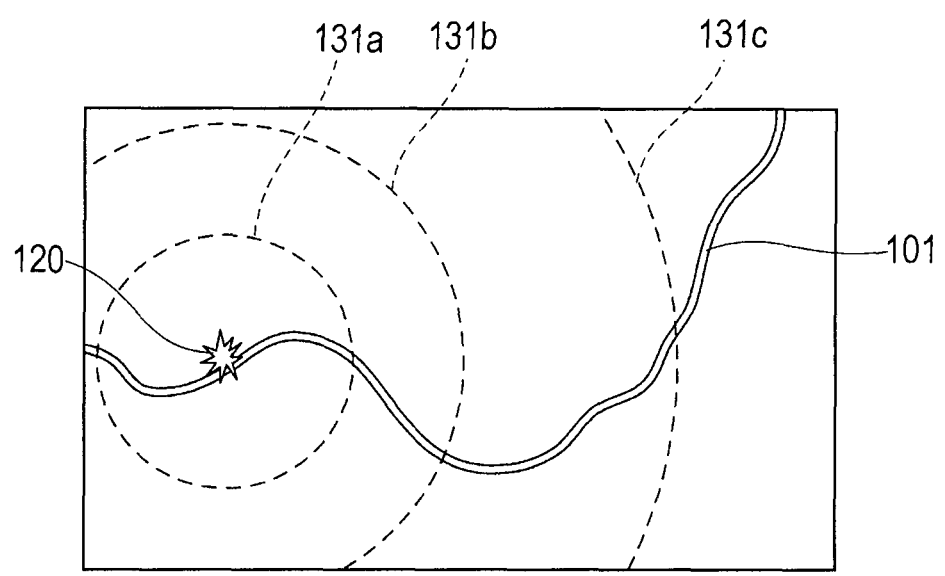
FIG. 18 is a view illustrating stop position ranges according to a further embodiment.

[4C] According to the third embodiment, a stop position range is set as a latitude and longitude range based on a stop position. However, other methods may be used for this setting. For example, a range may be divided into circles 131 (131a to 131c) around the stop position 120 (i.e., divided in accordance with the distance in a straight line from the stop position) as illustrated in FIG. 18.

Alternatively, stop position ranges may be set in accordance with a real traveling distance on the road 101 based on divisions of spots provided at intervals of 500 m from the stop position, for example.

[4D] The specific range may be classified into a plurality of types such that the communication system between the server device 2 and the information processing system 5 is changeable in accordance with the classification of the specific range of entry.

Figure 19:
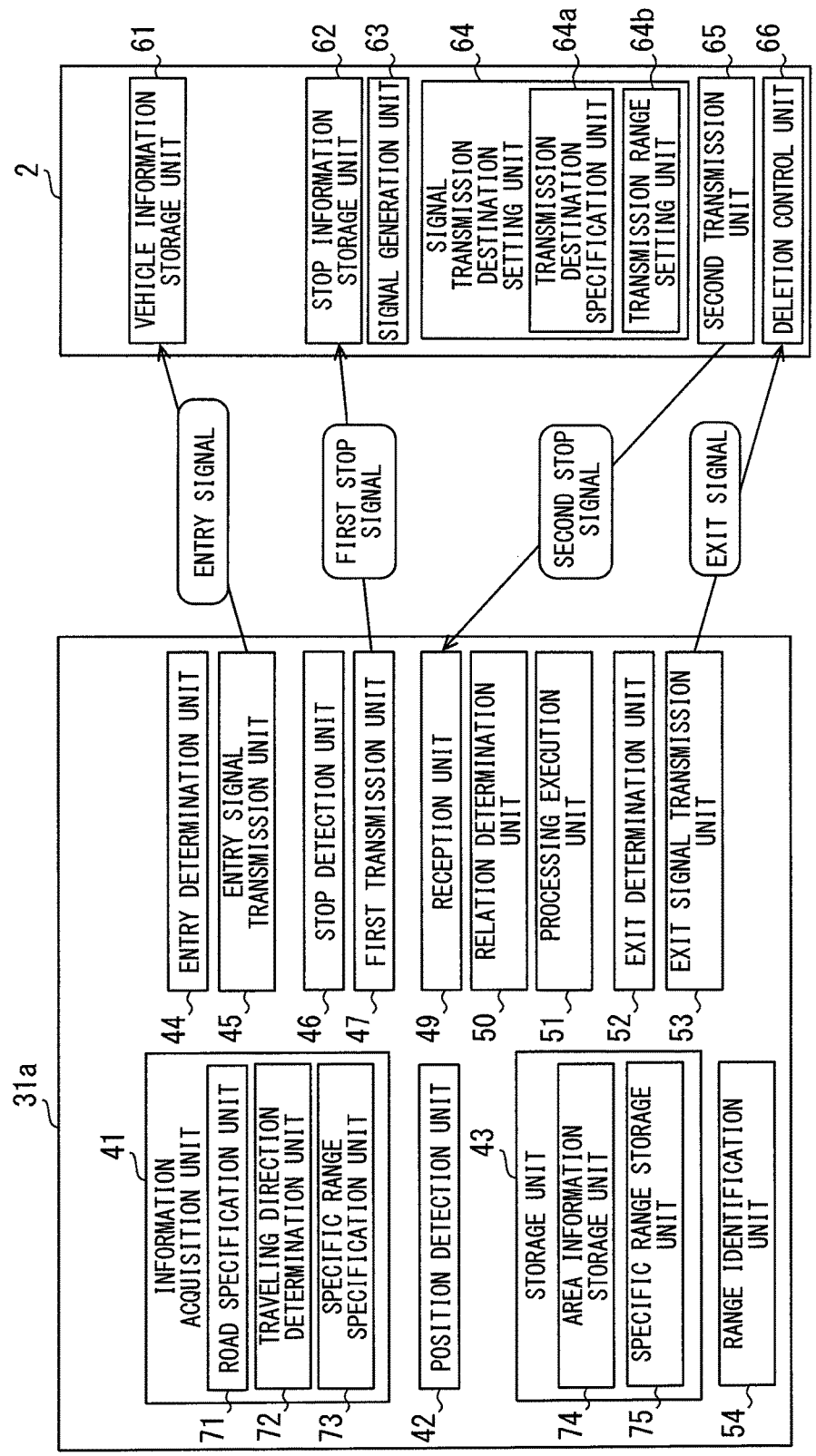
FIG. 19 is a function block diagram of a reporting system according to a still further embodiment.

As illustrated in FIG. 19, an information processing device 31a functions as a range identification unit 54 that identifies a type of a specific range determined as a specific range of entry by the entry determination unit 44. The first transmission unit 47 is configured to communicate by communication systems in conformity to a plurality of communication standards, and transmit traveling area information and the like to the server device 2 by the communication system set beforehand in accordance with the type of the specific range identified by the range identification unit 54.

This structure therefore determines correspondence between specific ranges and communication systems. Arbitrary methods for determining correspondence between specific ranges and communication methods may be used, such as individual correspondence for each specific range, or correspondence in accordance with roads, road types, districts of roads, and other conditions.

For realizing communication by communication methods in conformity to a plurality of communication standards, the information processing device 31*a* may include a plurality of communication modules for different communication standards.

[4E] According to the embodiment described above, road IDs, traveling direction information, and specific range IDs are included in traveling area information. However, all of these IDs and information are not necessarily required for the traveling area information as long as at least one of these is included in the traveling area information. For example, a vehicle traveling area may be narrowed based on a road ID or a specific range ID when the road ID or specific range ID is identified. In addition, a vehicle traveling area may be narrowed based on a traveling direction when signals transmitted from the signal transmission and reception device 3 toward vehicles have a limited range.

[4F] According to the embodiments described above, the server device 2 and the information processing system 5 communicate with each other via the signal transmission and reception device 3. However, the respective information processing systems 5 may directly communicate with each other without interposition of the server device 2, i.e., may perform vehicle-to-vehicle communication. In this case, the signal transmission and reception device 3 may be interposed between the respective information processing systems 5.

According to the structure that performs direct communication between the information processing systems 5, the information processing system 5 carried on the vehicle 4 having stopped traveling transmits a first stop signal to the outside, while the information processing system 5 carried on the different vehicle 4 receives the first stop signal. The received first stop signal includes information about the stop position of the stopping vehicle 4, and therefore is handled as a second stop signal described in the foregoing embodiments.

For realizing vehicle-to-vehicle communication, the communication module 36 may be configured to periodically and wirelessly broadcast data to an unspecified number of the different information processing devices 31 present around the transmission source information processing device 31 (within communication area of radio waves).

In each of the cases of communication via the server device 2, vehicle-to-vehicle communication, and road-to-vehicle communication without interposition of the server device, the information processing system 5 stores, in the storage unit, information on destinations to which signals are transmitted. In a case of broadcasting, destinations are designated at such addresses at which the respective information processing systems 5 provided on different vehicles are allowed to receive transmission.

[4G] According to the embodiments described above, the information processing system 5 is carried on each of the vehicles 4. However, arbitrary structures may be adopted as long as all the function units are provided inside the vehicle 4 as a system. More specifically, all the configurations for allowing the function as the information processing system are only required to be movable in accordance with movement of the vehicle 4. For example, a part or all of the information processing system may be taken into the vehicle 4 (or taken out of vehicle 4).

According to a specific example of this structure, an information processing device (terminal device), such as a smartphone, may be configured to perform the function of the information processing device 31 in the embodiments described above. In this case, the vehicle 4 may include an interface device (such as wireless communication device communicating with smartphone) for communicating with devices and sensors (wireless signal reception device 21, GPS receiver 22, steering angle sensor 23, and speed sensor 24) desired to be carried on the vehicle 4.

The respective functions of the information processing device 31 may be provided on either the vehicle 4 or a smartphone. A typical smartphone having wireless communication functions such as telephone lines is capable of performing the functions of the entry signal transmission unit 45, the first transmission unit 47, the reception unit 49, and other communication functions. The information acquisition unit 41, the entry determination unit 44, the stop detection unit 46, the processing execution unit 51, and others may be collectively controlled by using a smartphone to smoothly handle the processing.

[4H] According to the embodiments described above, traveling area information is acquired by the information processing system 5. However, traveling area information may be generated by the server device 2.

Figure 20:
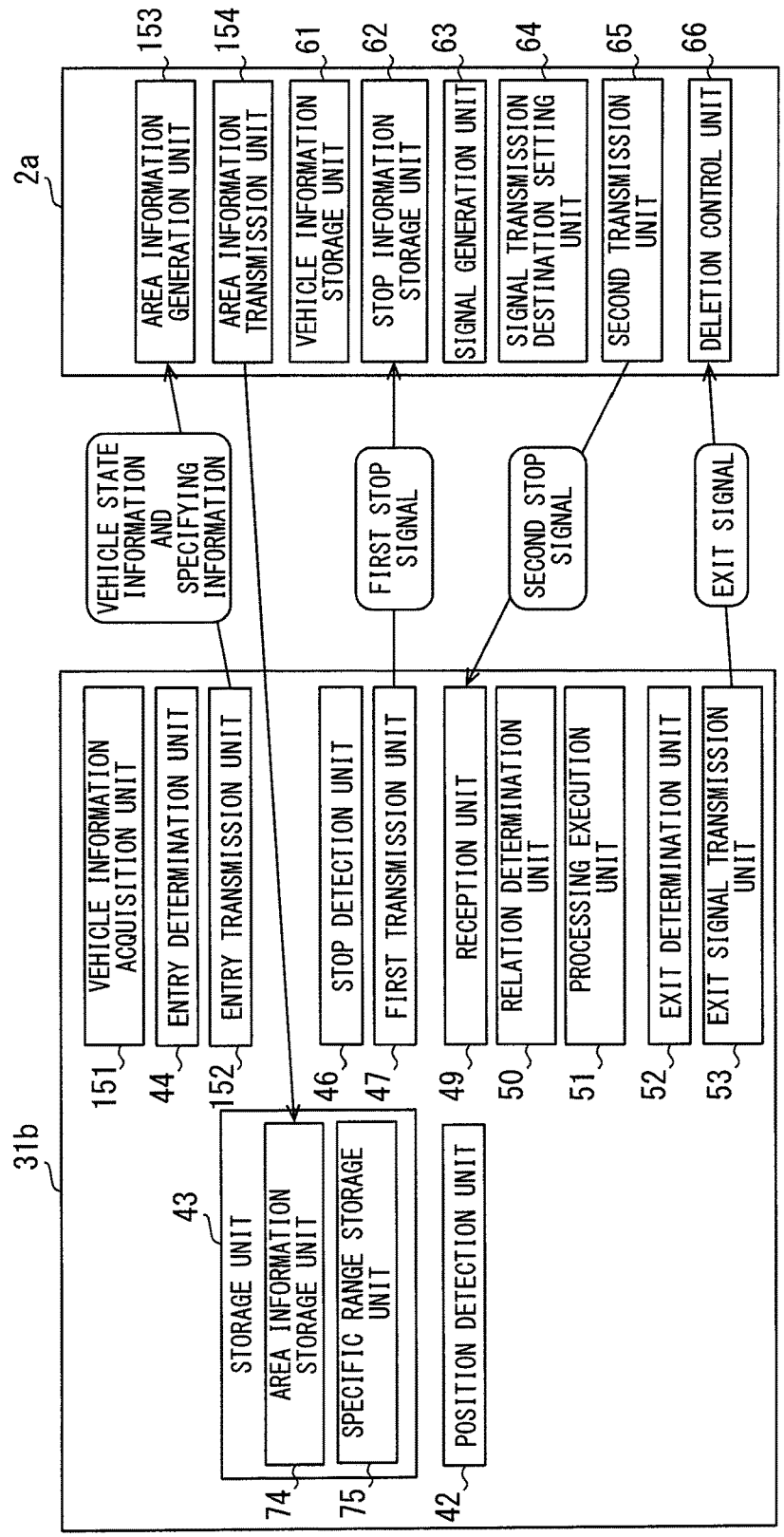
FIG. 20 is a function block diagram of a reporting system according to a still further embodiment.

More specifically, according to an information processing device 31*b* of the information processing system 5, a vehicle information acquisition unit 151 acquires information indicating states of a vehicle and including vehicle position information and information on steering rotation as illustrated in FIG. 20. An entry transmission unit 152 transmits a signal including the information on states of the vehicle and specifying information for specifying the information processing system 5 as an entry signal to the server device when the entry determination unit 44 detects entry of the vehicle into a specific range.

On a server device 2*a* side, an area information generation unit 153 generates traveling area information based on the information included in the transmitted entry signal and indicating states of the vehicle. An area information transmission unit 154 transmits the generated traveling area information to the information processing system 5 corresponding to a transmission source specified by the specifying information included in the entry signal.

Thereafter, on the information processing system 5 side, the area information storage unit 74 stores traveling area information transmitted from the server device as information on the traveling area of the vehicle 4.

Similarly to the first to third embodiments described above, there are provided the stop detection unit 46, the first transmission unit 47, the processing execution unit 51, the signal generation unit 63, the signal transmission destination setting unit 64 (transmission destination specifying unit 64*a* or transmission range setting unit 64*b*), the second transmission unit 65, and others.

According to the reporting system thus configured, a processing load imposed on the information processing system 5 decreases.

[4I] According to the first embodiment, the specifying information is stored in the area list to allow storage of the traveling area information and the specifying information in association with each other. However, each combination of the traveling area information and the specifying information may be individually managed without using the area list.

Figure 21:
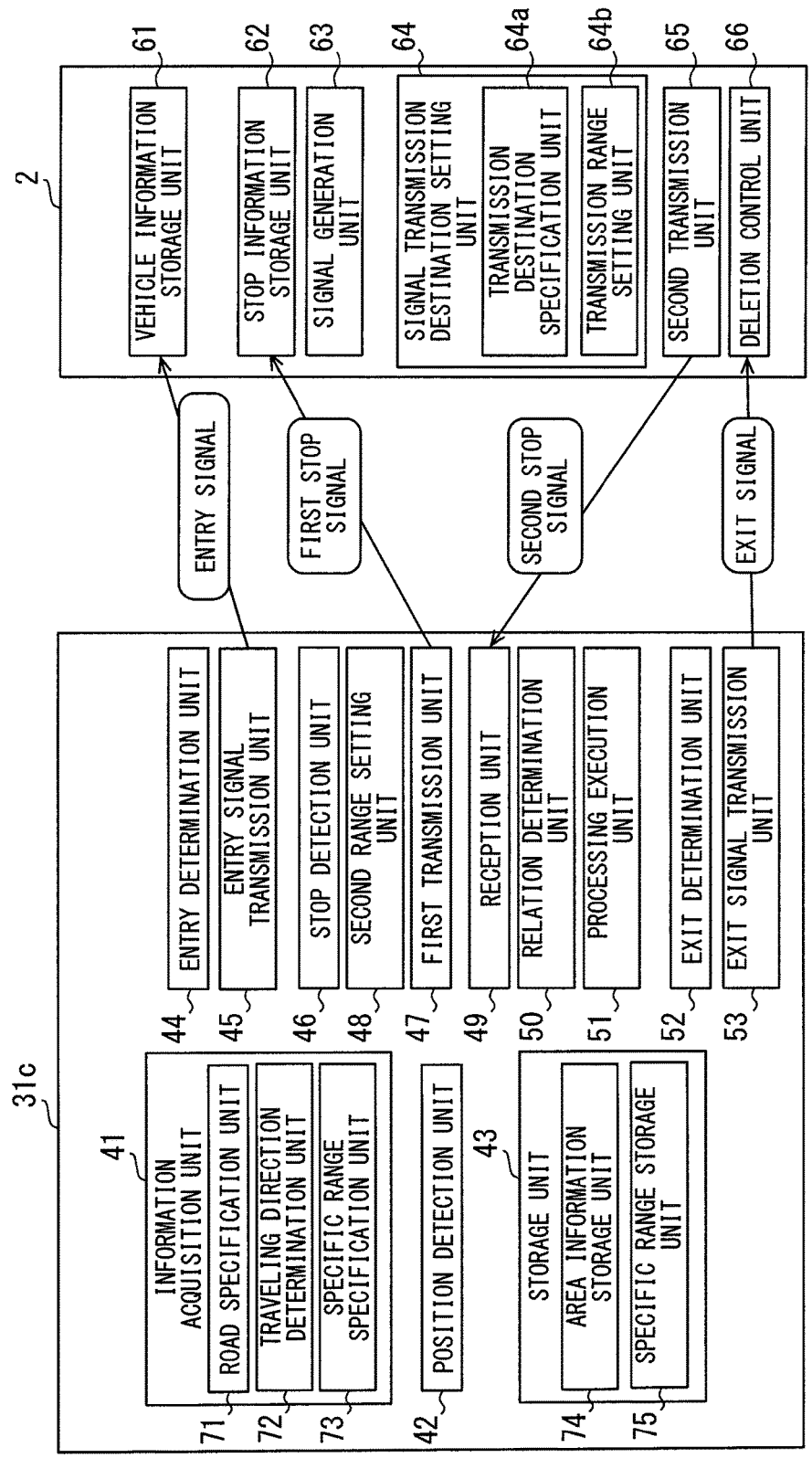
FIG. 21 is a function block diagram of a reporting system according to a still further embodiment.

[4J] According to the embodiments described above, a stop position range is set by the transmission range setting unit 64b provided on the server device 2. However, the stop position range may be set by the information processing system 5. As illustrated in FIG. 21, an information processing device 31c according to the present embodiment includes a second range setting unit 48.

The second range setting unit 48 sets one or more ranges (stop position ranges) in accordance with the distance from a starting point corresponding to the current position of the vehicle 4 detected by the position detection unit 42 when a vehicle stop is detected by the stop detection unit 46. The first transmission unit 47 transmits a first stop signal including information on the set range, and traveling area information stored in the area information storage unit 74 to the server device 2.

According to this structure, the transmission range setting unit 64b of the server device 2 need not perform processing. A signal including information indicating the stop position range set by the second range setting unit 48 is transmitted as a second stop signal B.

According to the reporting system thus configured, advantageous effects similar to those of the third embodiment described above are provided.

[4K] According to the third embodiment described above, a signal including information on a stop position range is broadcasted to the information processing system 5 as a second stop signal B. However, a second stop signal B including information on a stop position range similarly to the third embodiment may be individually transmitted to the information processing system 5 rather than by broadcast transmission, similarly to the first embodiment.

[4L] A function performed by one constituent element in the embodiments described above may be divided into a plurality of parts performed by a plurality of constituent elements, or functions performed by a plurality of constituent elements may be unified into one function performed by one constituent element. At least a part of the structures of the embodiments may be replaced with known structures performing similar functions. In addition, a part of the structures of the embodiments may be eliminated.

Furthermore, at least a part of the structures of the embodiments may be added to or substituted for the structures of the other embodiments.

[4M] The function units constituting the information processing system 5 may be realized by hardware, or may be realized under programs for allowing a computer to perform the respective function units of the information processing system 5. In particular, the information acquisition unit 41, the entry determination unit 44, the stop detection unit 46, the entry signal transmission unit 45, the first transmission unit 47, and the processing execution unit 51 may be realized under the programs.

It is preferable that the foregoing computer includes a storage device capable of storing data, and a communication device capable of wirelessly communicating with the outside.

What is claimed is:

1. A reporting system comprising:
an information processing system arranged on a vehicle; and
a server device that wirelessly communicates with the information processing system, wherein:
the information processing system includes:
an information acquisition unit that acquires traveling area information corresponding to information on an area where the vehicle travels;
an entry determination unit that determines whether the vehicle has entered a specific range;
an entry signal transmission unit that transmits, to the server device, an entry signal as a signal including the traveling area information acquired by the information acquisition unit and specifying information for specifying the information processing system when the entry determination unit determines that the vehicle has entered the specific range;
a stop detection unit that detects a signal associated with a stop of traveling of the vehicle;
a first transmission unit that transmits a first stop signal, as a signal including the traveling area information, to the server device when the stop detection unit detects the signal associated with the stop; and
a processing execution unit that executes a predetermined process when receiving a second stop signal as a signal including information on a stop position of a different vehicle different from the vehicle on which the information processing system is arranged, the second stop signal being transmitted from the server device when the server device receives the first stop signal transmitted from the information processing system arranged on the different vehicle;
the server device includes:
a vehicle information storage unit that stores the traveling area information and the specifying information in association with each other when receiving the entry signal, which includes the traveling area information and the specifying information and is transmitted from the entry signal transmission unit;
a signal generation unit that generates the second stop signal based on the first stop signal transmitted from the first transmission unit;
a transmission destination specifying unit that specifies the information processing system when receiving the first stop signal transmitted from the first transmission unit, based on the traveling area information and the specifying information stored in the vehicle information storage unit, the information processing system being disposed in a range defined based on the traveling area information included in the first stop signal; and
a second transmission unit that transmits the second stop signal, generated by the signal generation unit, to the information processing system specified by the transmission destination specifying unit,
wherein the vehicle information storage unit of the server device stores the specifying information with priority defined in a predetermined standard;
the second transmission unit transmits the second stop signal to the information processing system according to the priority; and
wherein the priority is lower as the specifying information is newly stored in the vehicle information storage unit of the server device.

2. The reporting system according to claim 1, wherein: the information processing system further includes: an exit determination unit that determines whether the vehicle has exited from the specific range; and an exit signal transmission unit that transmits, to the server device, an exit signal as a signal including the specifying information for specifying the information processing system when the exit determination unit determines that the vehicle has exited from the specific range; and the server device further includes: a deletion control unit that deletes, from the vehicle information storage unit, the traveling area information associated with the specifying information included in the exit signal when receiving the exit signal transmitted from the exit signal transmission unit.

3. The reporting system according to claim 1, wherein: the information processing system further includes a position detection unit that detects a position of the vehicle; the first stop signal includes information indicating a current position of the vehicle detected by the position detection unit; the signal generation unit sets one or more road areas, according to a distance from a start point located at the current position of the vehicle, based on information indicating the current position included in the first stop signal, and generates the second stop signal including information indicating the road areas as information on a stop position of the vehicle; and the processing execution unit determines whether the vehicle is located within the road areas included in the second stop signal received by the information processing system, and executes a predetermined process in accordance with a result of determination.

4. A reporting system comprising:
an information processing system arranged on a vehicle; and
a server device that wirelessly communicates with the information processing system, wherein:
the information processing system includes:
  a vehicle information acquisition unit that acquires position information on the vehicle and information indicating a state of the vehicle including information on steering rotation;
  an entry determination unit that determines whether the vehicle has entered a specific range;
  an entry transmission unit that transmits an entry signal to the server device when the entry determination unit determines that the vehicle has entered the specific range, the entry signal including the information indicating the state of the vehicle acquired by the vehicle information acquisition unit and specifying information for specifying the information processing system;
  an area information storage unit that stores traveling area information transmitted from the server device as information on an area where the vehicle travels;
  a stop detection unit that detects a signal associated with a stop of travelling of the vehicle;
  a first transmission unit that transmits, to the server device, a first stop signal as a signal including the traveling area information stored in the area information storage unit when the stop detection unit detects the signal associated with the stop; and
  a processing execution unit that executes a predetermined process when receiving a second stop signal as a signal including information on a stop position of a different vehicle different from the vehicle on which the information processing system is arranged, the second stop signal being transmitted from the server device when the server device receives the first stop signal transmitted from the information processing system arranged on the different vehicle, and
the server device includes:
  an area information generation unit that generates the traveling area information based on the information on the state of the vehicle included in the entry signal transmitted from the entry transmission unit;
  an area information transmission unit that transmits the traveling area information, generated by the area information generation unit, to the information processing system which is a transmission source of the information indicating the state of the vehicle, the information processing system specified by the specifying information included in the entry signal;
  a signal generation unit that generates the second stop signal based on the first stop signal transmitted from the first transmission unit;
  a signal transmission destination setting unit that sets a transmission destination, to which the second stop signal is transmitted, based on at least the traveling area information included in the first stop signal when receiving the first stop signal transmitted from the first transmission unit; and
  a second transmission unit that transmits the second stop signal, generated by the signal generation unit, to the transmission destination set by the signal transmission destination setting unit;
  wherein the area information generation unit generates the traveling area information based on the information on the state of the vehicle with priority defined in a predetermined standard;
  the second transmission unit transmits the second stop signal to the transmission destination according to the priority; and
  wherein the priority is lower as the entry signal is newly transmitted from the entry transmission unit.

5. A server device that wirelessly communicates with an information processing system arranged on a vehicle, the server device comprising:
  a vehicle information storage unit that stores traveling area information in an entry signal and specifying information in the entry signal in association with each other when receiving the entry signal including the traveling area information on an area where the vehicle travels and the specifying information for specifying the information processing system, the entry signal being transmitted from the information processing system in a case where the vehicle mounting the information processing system enters a specific range;
  a signal generation unit that generates a second stop signal based on a first stop signal including the traveling area information, the first stop signal being transmitted from the information processing system when the vehicle mounting the information processing system stops traveling or is in a state difficult to continue normally traveling;
  a transmission destination specifying unit that specifies the information processing system, disposed within a range defined based on the traveling area information included in the first stop signal, according to the traveling area information and the specifying information stored in the vehicle information storage unit when receiving the first stop signal; and
  a second transmission unit that transmits the second stop signal, generated by the signal generation unit, to the information processing system specified by the transmission destination specifying unit;
wherein the vehicle information storage unit stores the specifying information with priority defined in a predetermined standard;
the second transmission unit transmits the second stop signal to the information processing system according to the priority; and
wherein the priority is lower as the specifying information is newly stored in the vehicle information storage unit.

* * * * *